United States Patent
Ifuku et al.

(10) Patent No.: US 10,036,935 B2
(45) Date of Patent: Jul. 31, 2018

(54) IMAGING APPARATUS AND MOUNT ADAPTER

(71) Applicant: CANON KABUSHIKI KAISHA, Tokyo (JP)

(72) Inventors: Hirotaka Ifuku, Kawasaki (JP); Yuya Fujiwara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/728,635

(22) Filed: Oct. 10, 2017

(65) Prior Publication Data
US 2018/0107098 A1 Apr. 19, 2018

(30) Foreign Application Priority Data

Oct. 18, 2016 (JP) .................. 2016-204445

(51) Int. Cl.
*G03B 17/14* (2006.01)
*G02B 7/02* (2006.01)
*H04N 5/225* (2006.01)
*G03B 17/56* (2006.01)

(52) U.S. Cl.
CPC .............. *G03B 17/14* (2013.01); *G02B 7/02* (2013.01); *G03B 17/565* (2013.01); *H04N 5/2254* (2013.01); *G03B 17/561* (2013.01); *H04N 5/2252* (2013.01)

(58) Field of Classification Search
None
See application file for complete search history.

(56) References Cited

U.S. PATENT DOCUMENTS

| 9,709,875 | B2* | 7/2017 | Awazu | G03B 17/14 |
| 2008/0292306 | A1* | 11/2008 | Watanabe | G03B 17/14 |
| | | | | 396/448 |
| 2011/0052185 | A1* | 3/2011 | Urakami | G03B 17/00 |
| | | | | 396/530 |
| 2016/0124290 | A1* | 5/2016 | Bergreen | G03B 17/565 |
| | | | | 396/533 |
| 2016/0295082 | A1* | 10/2016 | Iinuma | H04N 5/2254 |
| 2016/0330354 | A1* | 11/2016 | Moriyama | G03B 17/566 |
| 2016/0344909 | A1* | 11/2016 | Noguchi | G02B 7/09 |
| 2017/0289415 | A1* | 10/2017 | Tokunaga | G03B 17/14 |

FOREIGN PATENT DOCUMENTS

JP 2010-026120 A 2/2010

* cited by examiner

*Primary Examiner* — W B Perkey
(74) *Attorney, Agent, or Firm* — Cowan, Liebowitz & Latman, P.C.

(57) ABSTRACT

A body of an imaging apparatus comprises a mount section on which an interchangeable lens and a mount adapter can be mounted. A contact unit is movable in the direction of the optical axis by a moving mechanical unit and has a first contact portion composed of a plurality of contact terminals. If the interchangeable lens is mounted on a body via a first mount adapter, the first contact portion is movable to a first position that contacts a second contact portion formed in the interchangeable lens. If the interchangeable lens is mounted on the body via a second mount adapter, the first contact portion is movable to a second position that contacts the second contact portion of the interchangeable lens.

22 Claims, 37 Drawing Sheets

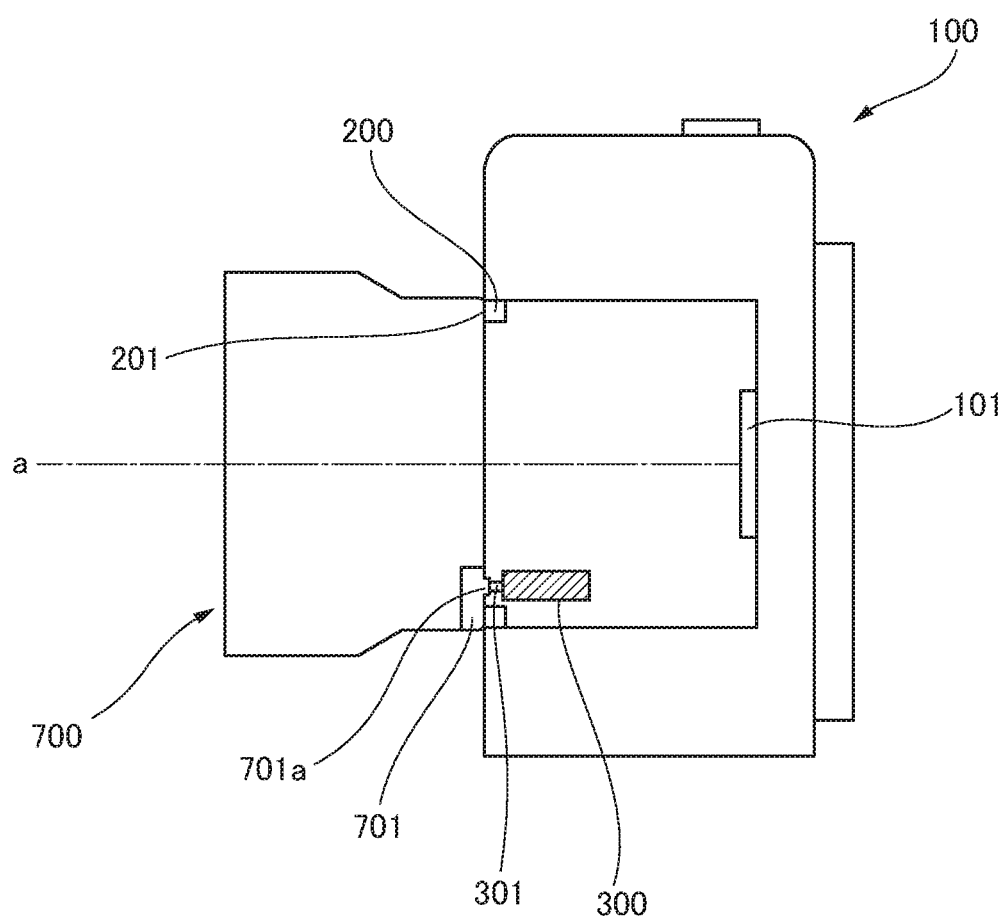

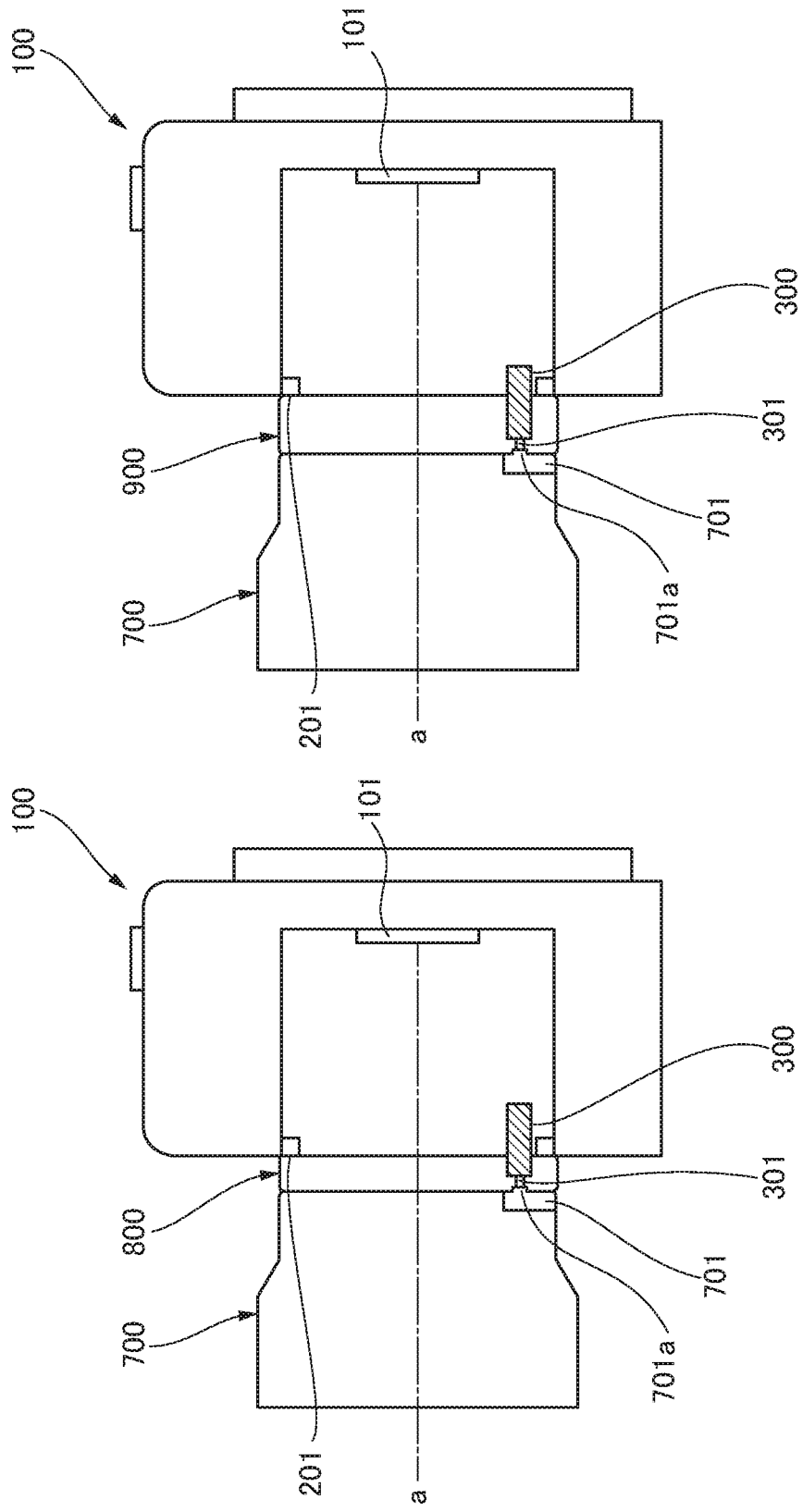

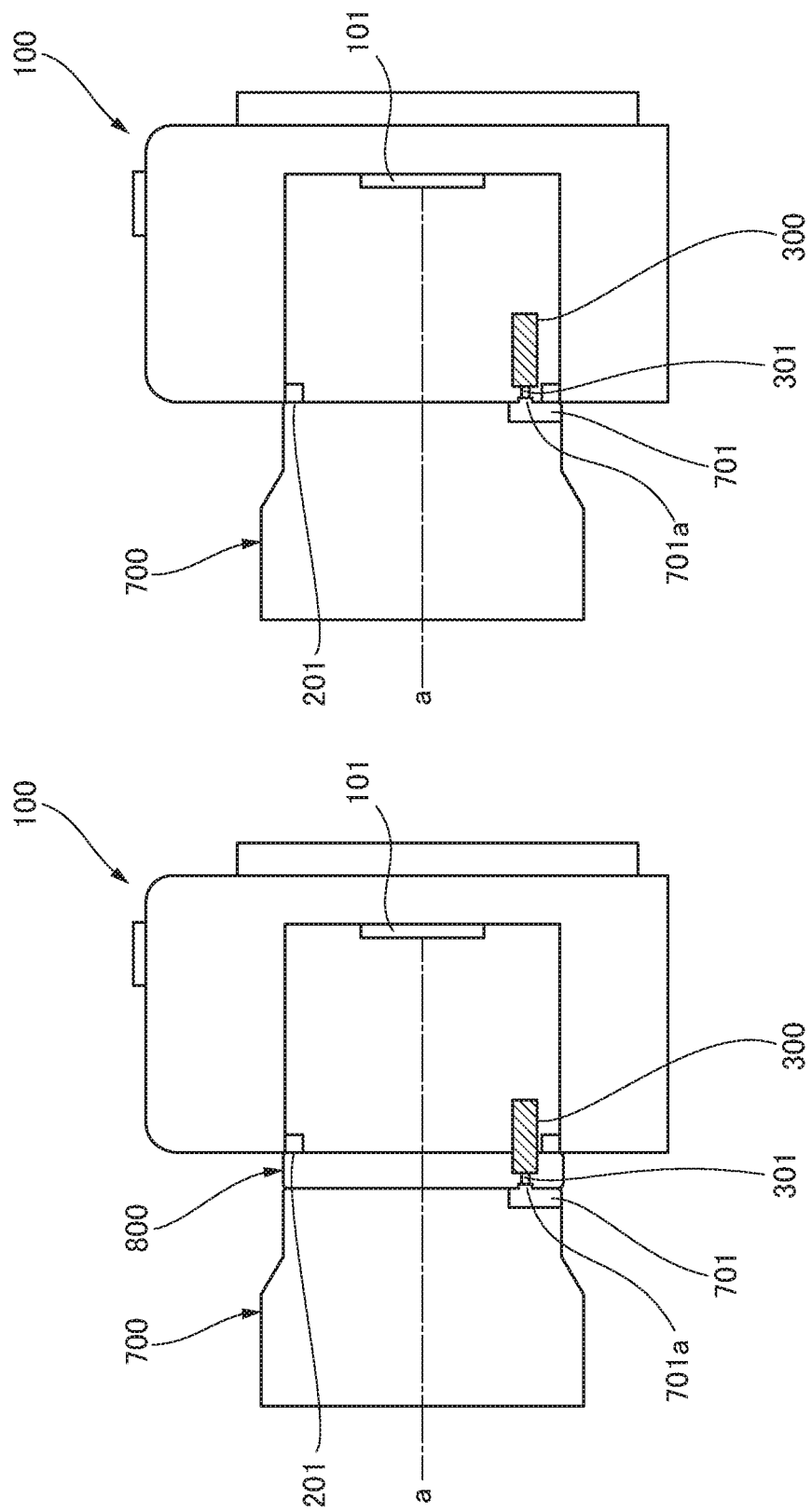

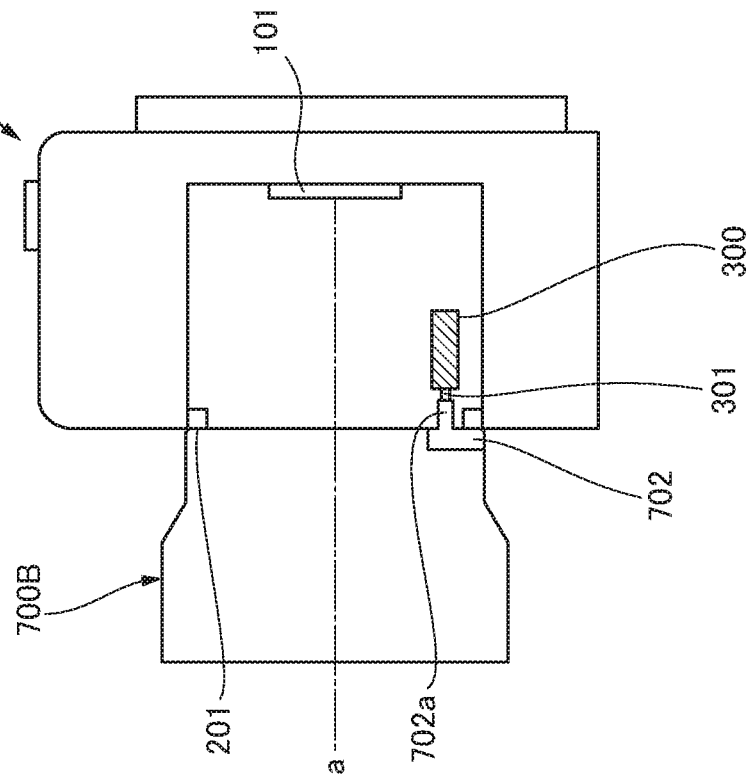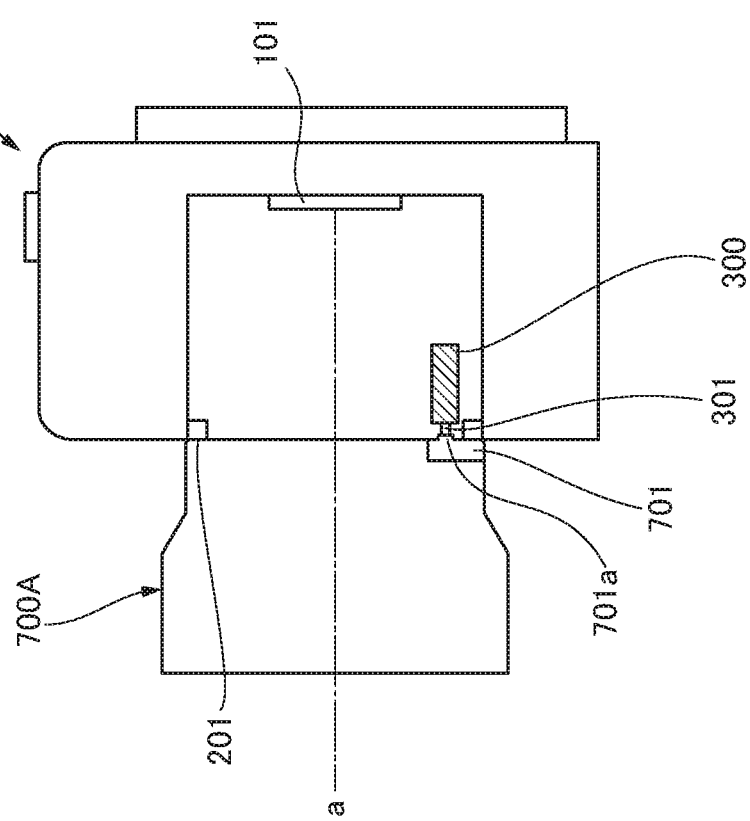

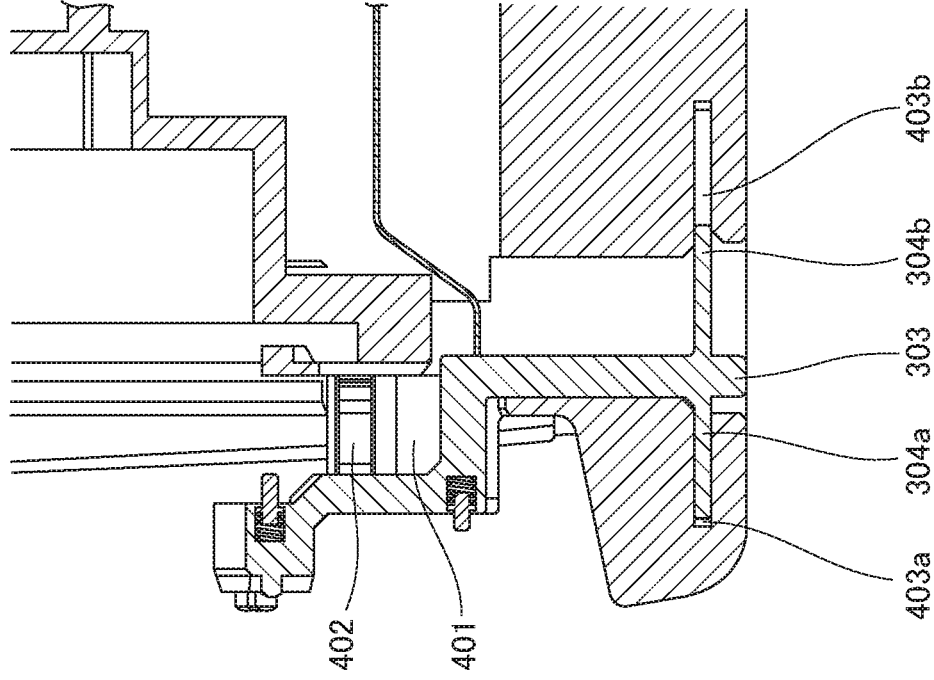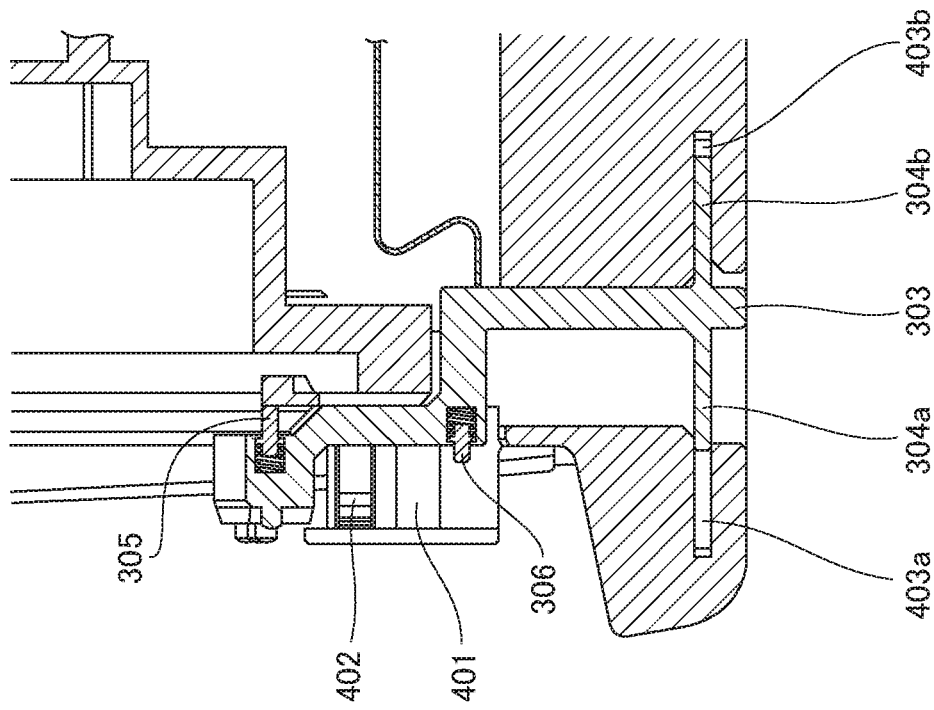

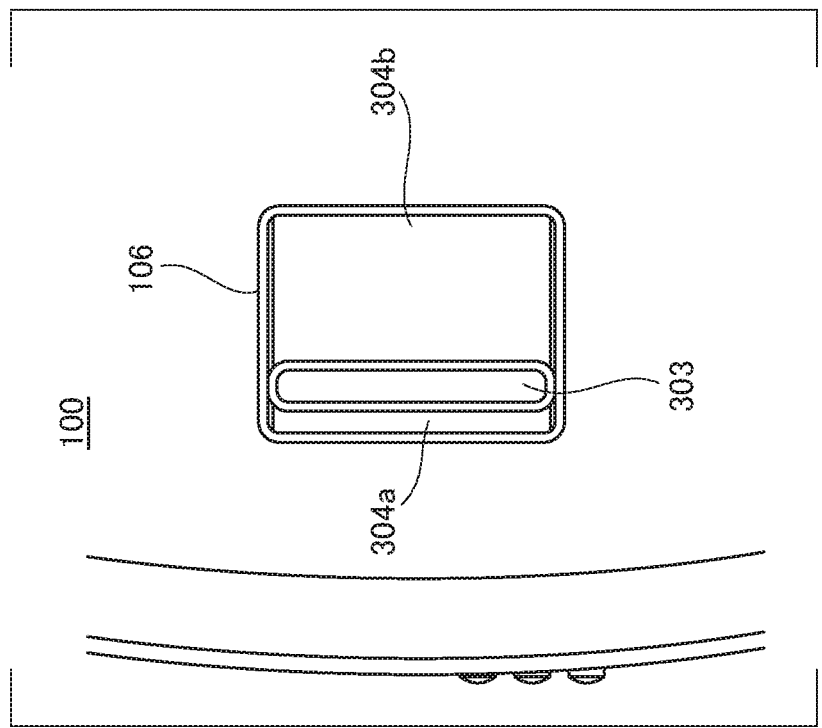
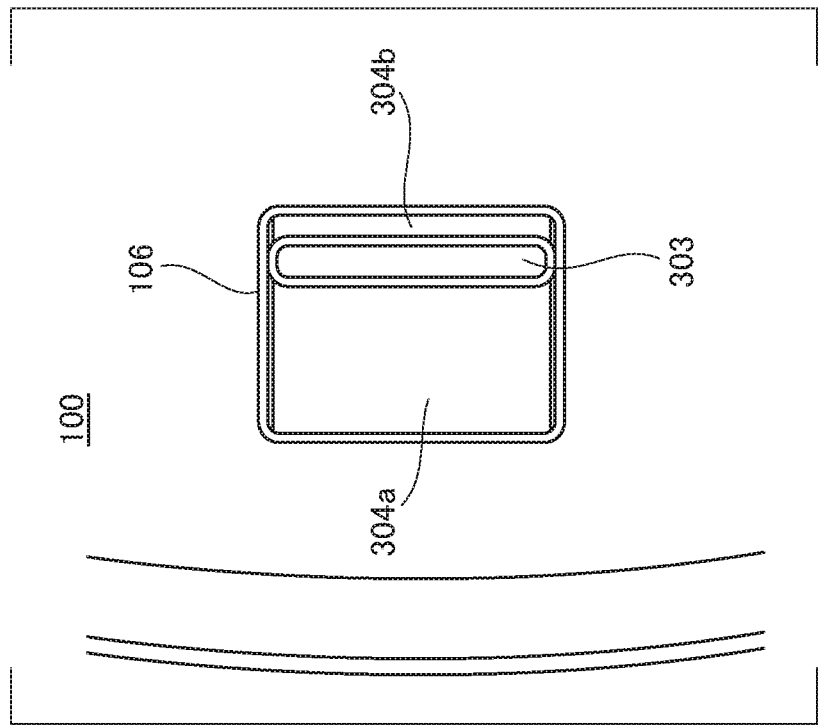

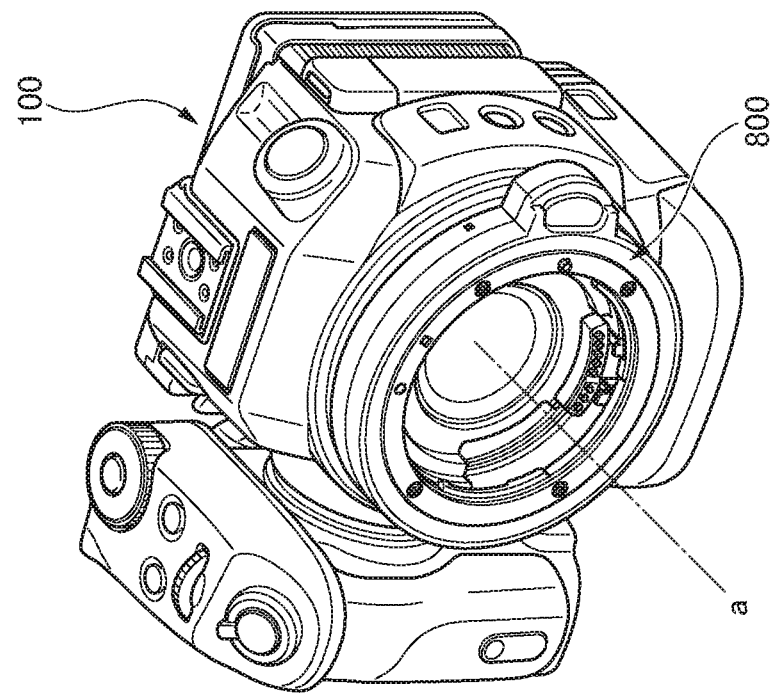
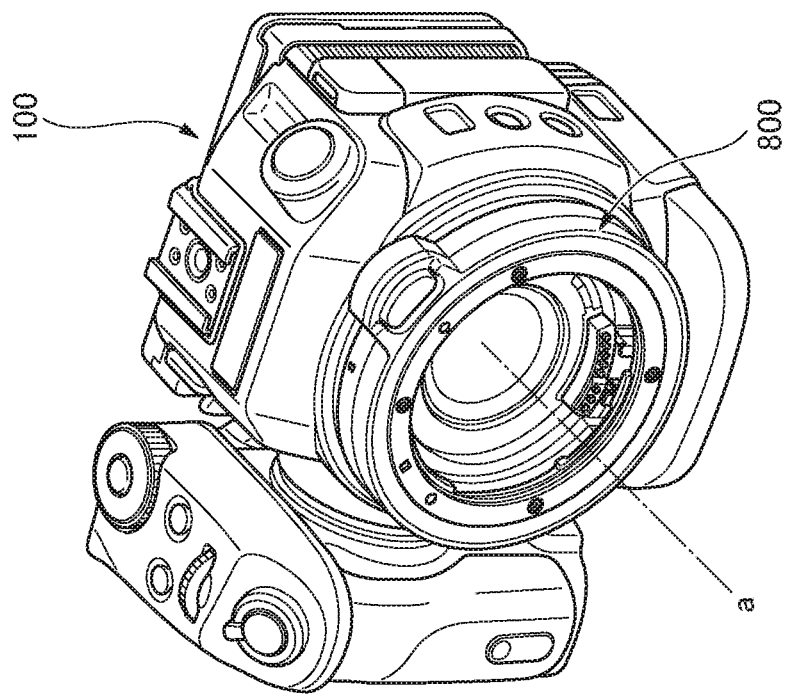

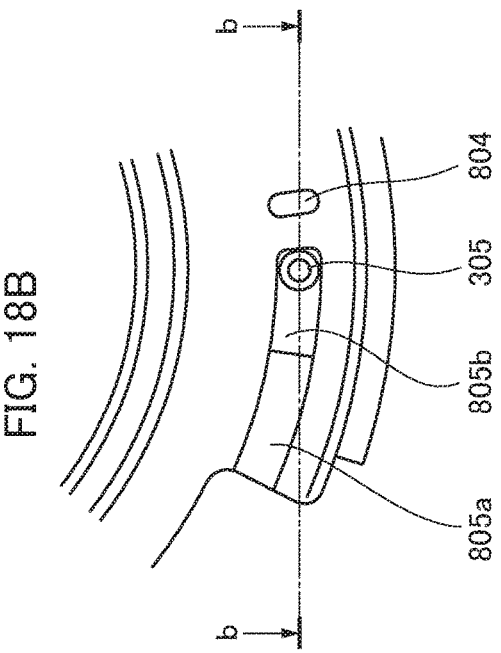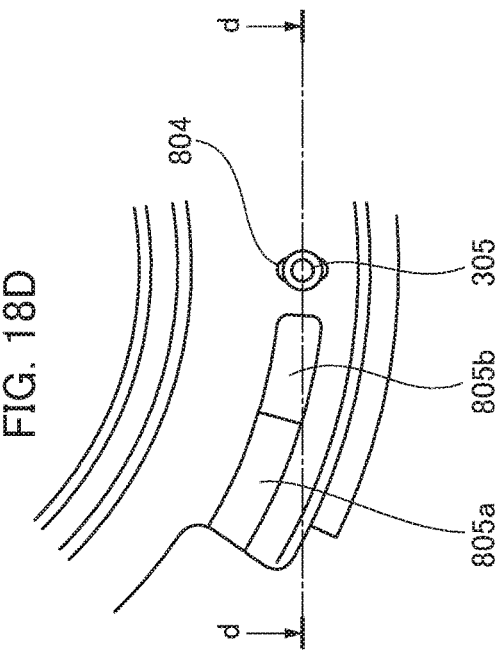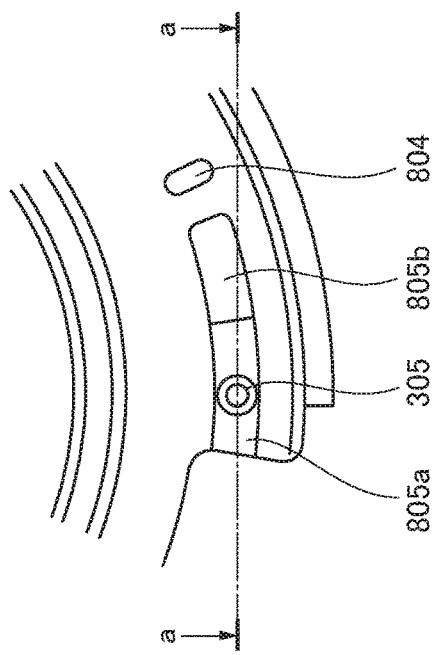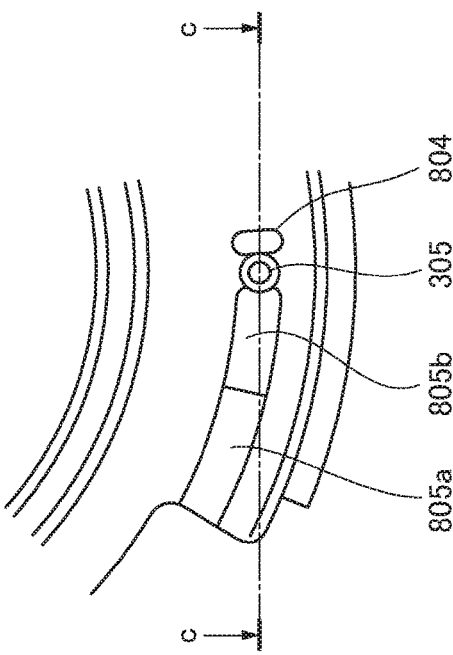

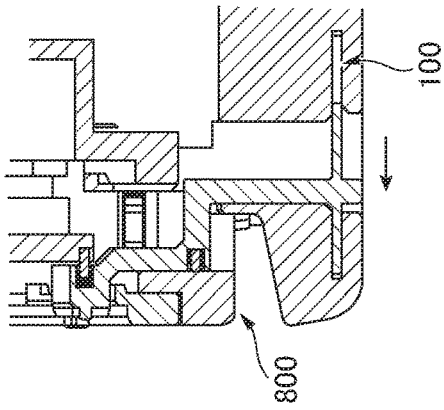
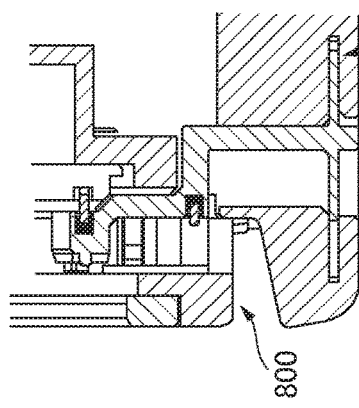
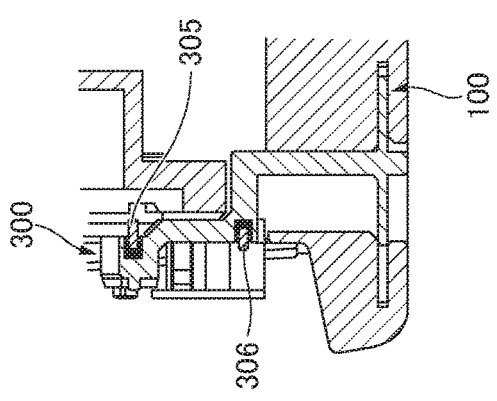
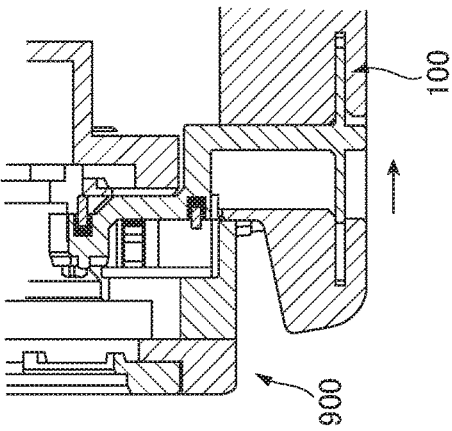
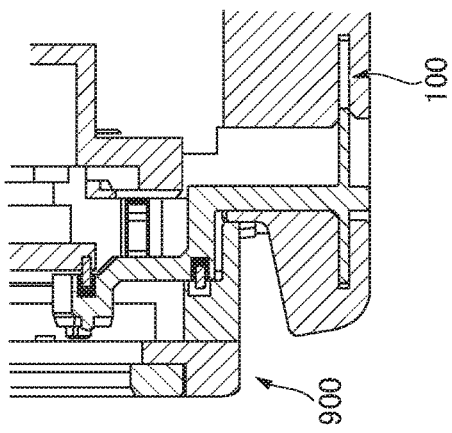
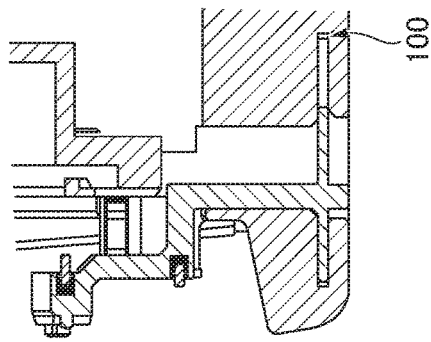

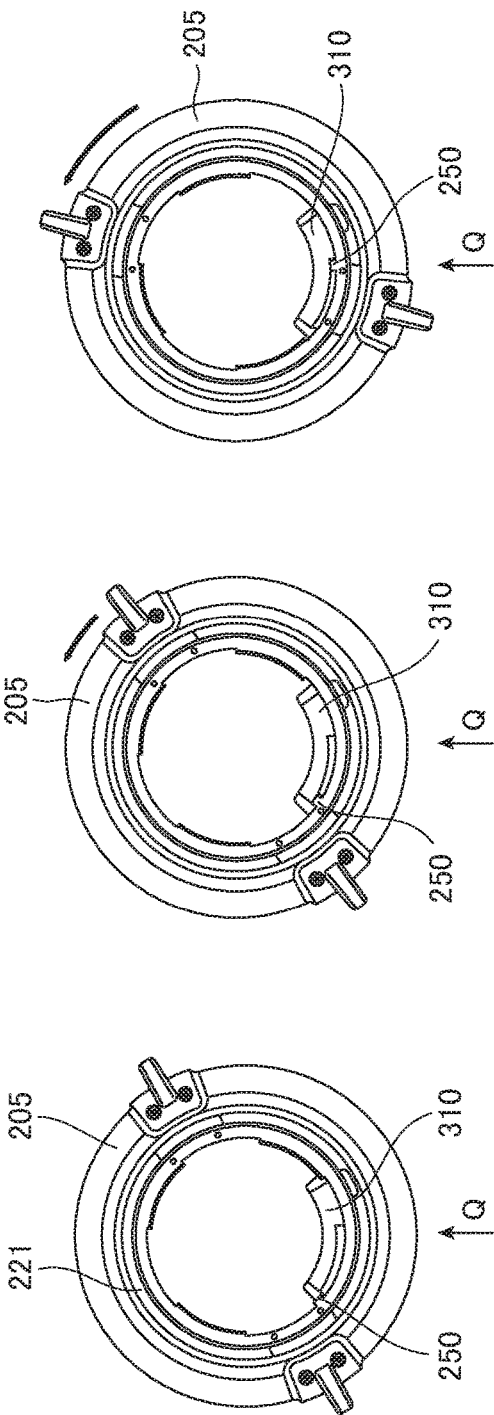

IMAGING APPARATUS AND MOUNT ADAPTER

BACKGROUND OF THE INVENTION

Field of the Invention

The present invention relates to an imaging system that can mount a lens device and a mount adapter on the body of an imaging apparatus.

Description of the Related Art

A mirrorless single-lens reflex camera is a lens interchangeable camera having a structure that does not have a mirror box inside an apparatus, and a flange focal length is often set shorter than a typical single lens reflex camera. If an interchangeable lens for a single-lens reflex camera with a long flange focal length is mounted on a camera body and used, it is necessary to mount a mount adapter for flange focal length adjustment. The focus position can be appropriately set if a lens device having a mounting interface standard different from the camera body is used by mounting the mount adapter. Additionally, assuming that the use of the lens device of the mounting interface standard is the same as the camera body, there is a device provided with a teleconversion optical system in the mount adapter for the use in extending the focal length of the entire imaging optical system. A user can select various shooting forms by combining the camera body, the mount adapter, and the interchangeable lens. Japanese Patent Application Laid-Open No. 2010-26120 discloses a system provided with a wide conversion optical system in the mount adapter. Even if the lens device of the mounting interface standard having a different image circle is mounted on the camera body, an image can be formed with an appropriate size reduction or enlargement relative to the size of the image sensor of the camera body. By using this mount adapter, it is possible to acquire an object image with the angle of view obtained by the original system of the lens of the mounting interface standard having a different image circle.

In the lens interchangeable camera system, the camera body and the corresponding interchangeable lens each have a plurality of electrical contacts. If the interchangeable lens is mounted on the camera body, the electrical contacts come into contact with each other to electrically connect the camera body and the interchangeable lens. The mount adapter interposed between the camera body and the interchangeable lens includes electrical contacts to the camera body and electrical contacts to the interchangeable lens in order to relay communication between the camera body and the interchangeable lens.

The cost and weight increase due to providing the contacts for the relay on the mount adapter. Moreover, increasing the number of physical contact points causes the risk of communication failure. Hence, it is desirable to have a mechanical configuration in which the electrical contacts of the camera body directly contact the electrical contacts of the interchangeable lens. However, the position of the electrical contacts of the interchangeable lens corresponding to the mount portion of the camera body changes in accordance with the mounting or non-mounting of the mount adapter, the type of the mount adapter to be mounted on the camera body, and the standard of the interchangeable lens to be mounted.

SUMMARY OF THE INVENTION

The present invention is to provide an imaging apparatus and a mount adapter enabling electrical connection between a lens device and a body of the imaging apparatus, in a plurality of usage forms in which a position of an electrical contact of the lens device to be mounted on a mount portion of the body of the imaging apparatus changes.

An apparatus according of an embodiment of the present invention is an imaging apparatus provided with a mount section on which a lens device and a mount adapter are mounted, and comprises a contact unit configured to have a camera side contact portion electrically connected to an accessory side contact portion provided in the lens device or the mount adapter, and a moving mechanical unit configured to support the contact unit movably in the direction of the optical axis corresponding to the mount section. The contact unit is movable to a first position in a direction parallel to the direction of the optical axis and a second position that is different from the first position by the moving mechanical unit, in accordance with a type of the lens device or the mount adapter to be mounted on the mount section Further features of the present invention will become apparent from the following description of exemplary embodiments with reference to the attached drawings.

BRIEF DESCRIPTION OF THE DRAWINGS

FIG. 1 is a cross-sectional view schematically illustrating a structure of an imaging apparatus according to an embodiment of the present invention.

FIGS. 2A and 2B are cross-sectional views illustrating a mounted state of a mount adapter and an interchangeable lens according to a first embodiment.

FIGS. 3A and 3B are cross-sectional views illustrating a mounted state of the mount adapter and the interchangeable lens according to a second embodiment.

FIGS. 4A and 4B are cross-sectional views illustrating a mounted state of a plurality of different interchangeable lenses according to a third embodiment.

FIGS. 11A and 11B are cross-sectional views illustrating the contact moving mechanical unit of the contact unit in FIG. 10.

FIGS. 13A and 13B are bottom views illustrating a principal part of the imaging apparatus of the first example.

FIGS. 16A and 16B are perspective views illustrating the mounting operation of the first mount adapter.

FIGS. 18A to 18D are front views illustrating the relation between a rear lock pin, the mounting lock groove, and a lock pin guide.

FIGS. 23A to 23F are cross-sectional views illustrating a mounting operation of the first and second mount adapters.

FIGS. 32A to 32D illustrate positional relations between a front engagement groove and a contact terminal engagement portion of the imaging apparatus according to the second example.

DESCRIPTION OF THE EMBODIMENTS

Figure 5:
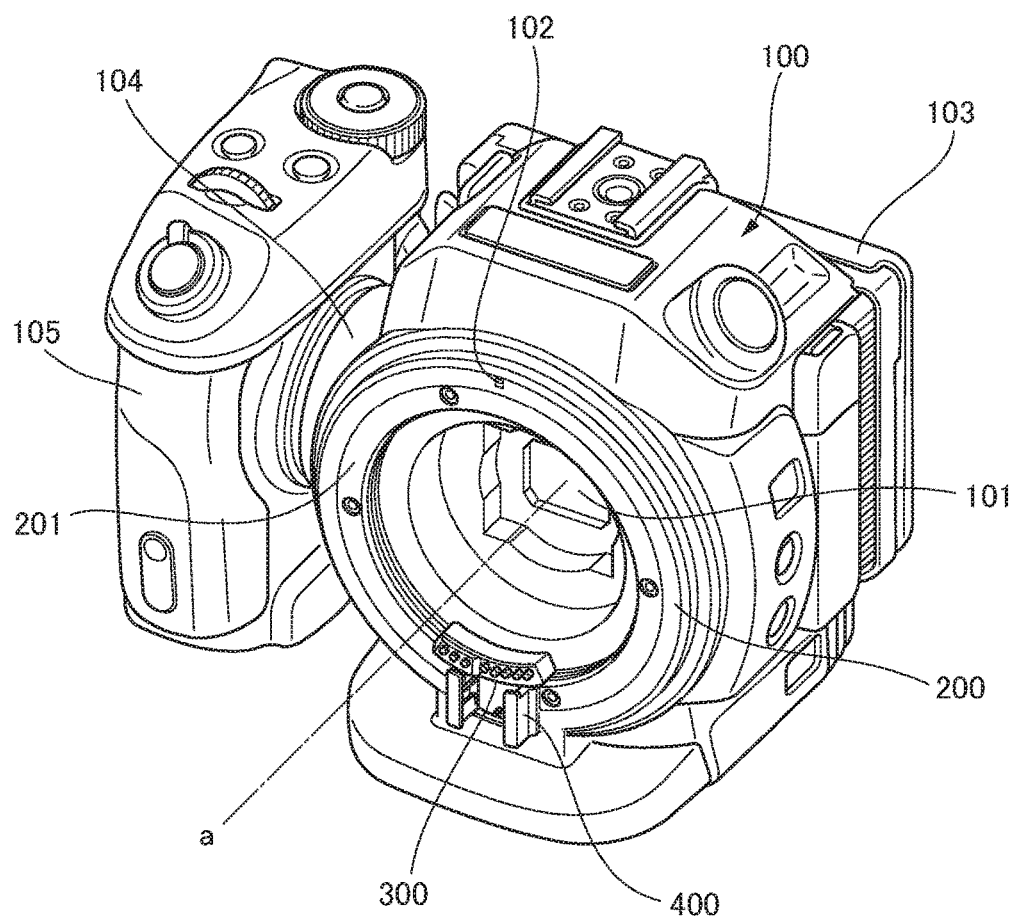
FIG. 5 is an external perspective view of the imaging apparatus according to the first example of the present invention.

Embodiments of the present invention will be described below. Each embodiment exemplifies an imaging apparatus to which the present invention is applied and does not limit the invention according to the claims, and all of the combinations of the features to be described below are not necessarily essential as means for solving the problem according to the present invention. In the present specification, an object side is defined as the front side in the direction of the optical axis of the imaging apparatus, and the positional relation between each unit (portion) will be described using each direction, up, down, left, and right, as viewed from the object side. As a matter shared by the embodiments, first, the structure of an imaging apparatus 100 will be described, and next, the main points of the first to third embodiments will be explained. Then, the first and second examples illustrating specific configurations of the imaging apparatus according to the first embodiment will be described with reference to detailed drawings.

With reference to FIG. 1, the imaging apparatus 100 according to the first to third embodiments will be described. FIG. 1 is a cross-sectional view schematically illustrating the structure of the imaging apparatus 100 according to one embodiment. FIG. 1 illustrates a state in which a lens device is mounted on the body of the imaging apparatus 100, and the optical axis of an imaging optical system including a lens group is shown by a chain line "a". The imaging apparatus 100 is referred to as an interchangeable lens camera that can be used by mounting the lens device on the body thereof, and includes a mount section 200. An interchangeable lens 700 or a mount adapter can be mounted on the mount section 200. A mount surface 201 is formed on the mount section 200 and an imaging element 101 is disposed on a focusing surface located behind the interchangeable lens 700 mounted on the mount section 200. The imaging element 101 photoelectrically converts an image of an object formed on a light receiving surface through the imaging optical system and outputs electric signals. Three primary color filters are arranged on the imaging plane of the object light, and red, green and blue light components are respectively transmitted. The light incident to the imaging element 101 is converted into electric signals for each color component and then undergoes a predetermined image processes to generate recording data and display data.

The imaging apparatus 100 includes a contact unit 300. The contact unit 300 is a member electrically connected to a lens contact terminal unit 701 of the interchangeable lens 700. On the contact unit 300, a plurality of contact terminals 301 (hereinafter, referred to as "first contact portions") are arranged in an exposed state to serve as a camera side contact portion. The lens contact terminal unit 701 is disposed in a state in which a plurality of lens contact terminals (hereinafter, referred to as "second contact portions") 701a are exposed to serve as an accessory side contact portion so as to face the first contact portions 301. By contact between the first contact portions 301 and the second contact portions 701a, the imaging apparatus 100 and the interchangeable lens 700 are electrically connected to each other to enable communication with each other.

The imaging apparatus 100 includes a moving mechanical unit of the contact unit 300. That is, the contact unit 300 is movable in the direction of the optical axis of the imaging optical system (the direction shown by a dash line "a") by the moving mechanical unit. Accordingly, even if the distance (the distance in the direction of the optical axis) between the mount surface 201 of the imaging apparatus 100 and the second contact portions 701a of the interchangeable lens 700 to be mounted on the mount surface 201 changes, the first contact portions 301 can be moved to a suitable position. The moving mechanical unit of the contact unit 300 will be described in detail in the first and second examples. An example in which the distance in the direction of the optical axis between the mount surface 201 and the second contact portions 701a changes will be described in three usage forms.

First Embodiment

A configuration of the present embodiment will be described with reference to FIGS. 2A and 2B. The interchangeable lens 700 is mounted on the imaging apparatus 100 via a mount adapter 800 or a mount adapter 900. FIG. 2A is a schematic cross-sectional view illustrating a usage form in which the interchangeable lens 700 is mounted on the body of the imaging apparatus 100 via the first mount adapter 800. FIG. 2B is a schematic cross-sectional view illustrating a usage form in which the interchangeable lens 700 is mounted on the body of the imaging apparatus 100 via the second mount adapter 900. Hereinafter, the first mount adapter 800 is abbreviated as the "first MA 800" and the second mount adapter 900 is abbreviated as the "second MA 900". The first and second mount adapters do not have electrical connection means corresponding to the imaging apparatus 100 and the interchangeable lens 700. Hence, if communication between the imaging apparatus 100 and the interchangeable lens 700 is executed, it is necessary that the first contact portions 301 directly contact the second contact portions 701a.

The first MA 800 shown in FIG. 2A illustrates a mount adapter having a relatively narrow width in the direction of the optical axis, and is mounted on the mount surface 201 of the imaging apparatus 100. The interchangeable lens 700 is mounted via the first MA 800. Additionally, the second MA 900 shown in FIG. 2B illustrates a mount adapter having a relatively larger width in the direction of the optical axis than the first MA 800, and is mounted on the mount surface 201 of the imaging apparatus 100. The interchangeable lens 700 is mounted via the second MA 900.

In this manner, via the mount adapter having a different width (thickness) in the direction of the optical axis, the interchangeable lenses having the same mount interface standard are mounted. In this case, in the mounted state of FIG. 2A and the mounted state of FIG. 2B, there is a difference in distance between the mount surface 201 and the second contact portions 701a, which corresponds to the difference in width of the mounting adapters in the direction of the optical axis. Accordingly, the moving mechanical unit of the contact unit 300 is provided so as to adjust to the difference by the movement of the contact unit 300. That is, the contact unit 300 is movable in the direction of the optical axis and takes a suitable position in accordance with the mount adapter mounted on the body of the imaging apparatus 100. Therefore, even if a plurality of mount adapters having different widths in the direction of the optical axis are mounted, contact between the first contact portions 301 of the body and the second contact portions 701a of the interchangeable lens becomes possible so that communication between the imaging apparatus 100 and the interchangeable lens 700 can be realized.

Second Embodiment

With reference to FIGS. 3A and 3B, an imaging apparatus according to a second embodiment will be described. FIG. 3A is a schematic cross-sectional view illustrating a usage form in which the interchangeable lens 700 is mounted on the body of the imaging apparatus 100 via the first MA 800. FIG. 3B is a schematic cross-sectional view illustrating a usage form in which the interchangeable lens 700 is directly mounted on the mount surface 201 of the body of the imaging apparatus 100 not via a mount adapter.

In the mounted state of FIG. 3A and the mounted state of FIG. 3B, there is a difference in distance between the mount surface 201 and the second contact portions 701a, which corresponds to the difference in width of the mounting adapters in the direction of the optical axis. Specifically, if using the state of FIG. 3B as a reference, in the state of FIG. 3A, the distance between the mount surface 201 and the second contact portions 701a corresponds to the width of the mount adapter 800 in the direction of the optical axis. Also in the present embodiment, the moving mechanical unit of the contact unit 300 is provided, and the contact unit 300 is movable in the direction of the optical axis. The contact unit 300 can take a suitable position in accordance with the presence or absence of mounting of the mount adapter. Therefore, in each state of the mounted state of the mount adapter and non-mounted state thereof, contact between the first contact portions 301 of the body and the second contact portions 701a of the interchangeable lens is possible so that communication between the imaging apparatus 100 and the interchangeable lens 700 can be realized.

Third Embodiment

With reference to FIGS. 4A and 4B, an imaging apparatus according to a third embodiment will be described. In the present embodiment, the first interchangeable lens 700A and the second interchangeable lens 700B are directly mounted on the mount surface 201 of the imaging apparatus 100 and used. FIG. 4A is a schematic cross-sectional view illustrating a usage form in which the first interchangeable lens 700A is mounted on the mount surface 201. FIG. 4B is a schematic cross-sectional view illustrating a usage form in which the second interchangeable lens 700B is mounted on the mount surface 201.

Although the first and second interchangeable lenses are mountable on the imaging apparatus 100, the positions of the lens contact terminal units in the direction of the optical axis are different. A first interchangeable lens 700A includes a first lens contact terminal unit 701 and a second interchangeable lens 700B includes a second lens contact terminal unit 702. If the first and second interchangeable lenses are respectively mounted on the imaging apparatus 100, there is a difference in the direction of the optical axis between the position of the second contact portions 701a of the lens contact terminal unit 701 and the position of the second contact portion 702a of the lens contact terminal unit 702. In the examples of FIGS. 4A and 4B, the second contact portion 702a is located more rearward (the imaging element 101 side) than the second contact portions 701a, resulting in the difference in position of the second connecting portion between the mounted state of FIG. 4A and the mounted state of FIG. 4B. Also in the present embodiment, the moving mechanical unit of the contact unit 300 is provided, by which the contact unit 300 is movable in the direction of the optical axis. That is, it is possible to take a suitable position corresponding to a forming position with the second contact portion of the interchangeable lens by a movement of the contact unit 300 in the direction of the optical axis. Hence, whether the first or second interchangeable lenses having a difference in position of the second contact portion is mounted, contact between the first contact portions 301 of the body and the second contact portion of the interchangeable lens becomes possible, thereby realizing communication between the imaging apparatus 100 and the interchangeable lens 700. In each embodiment described above, it is possible to provide an imaging apparatus that is available for shooting in various usage forms by providing a moving mechanical unit that supports the contact unit 300 so as to be movable in the direction of the optical axis.

First Example

Figure 6:
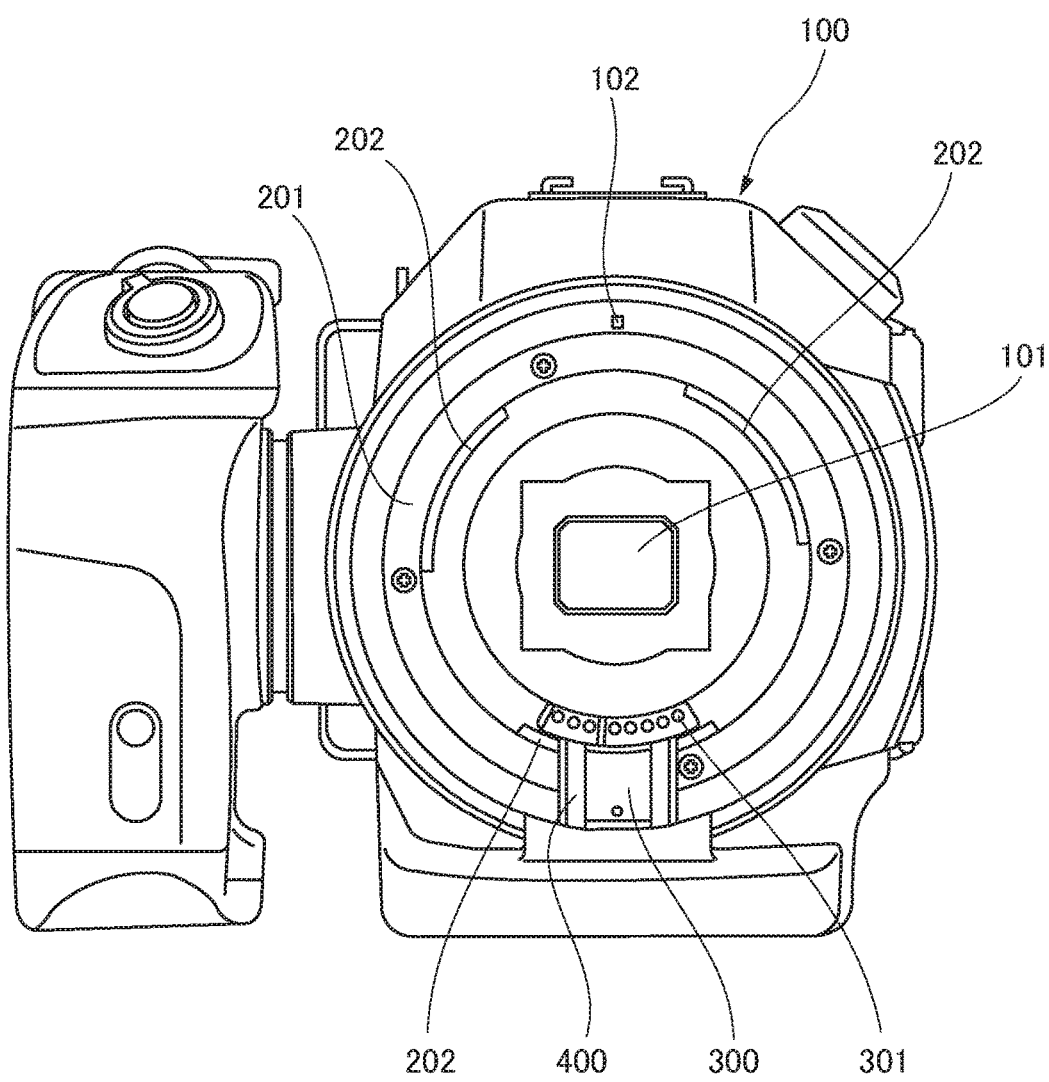
FIG. 6 is an external front view of the imaging apparatus according to the first example.

A specific structure of the first example according to the first embodiment will be described with reference to FIG. 5 to FIG. 23. FIG. 5 is an external perspective view of the imaging apparatus 100, and FIG. 6 is an external front view of the imaging apparatus 100. The mount section 200 is disposed on the front of the imaging apparatus 100, and the interchangeable lens or the mount adapter (hereinafter, referred to as an "object to be mounted") is mounted. The mount surface 201 is formed on the front of the mount section 200, and the mount section 200 includes a plurality of mount catches 202. In the present embodiment, three mount catches 202 are provided at predetermined angular intervals around the optical axis in order to hold the object to be mounted. An insertion index 102 is formed on the front of the imaging apparatus 100, and is used for phase alignment by the user if the object to be mounted is mounted on the body of the imaging apparatus (hereinafter, simply referred to as the "body").

The contact unit 300 is disposed at a lower position at the opening of the mount section 200 and includes the first contact portions 301. The first contact portions 301 are electrically connected to the second contact portions of the interchangeable lens. The contact unit 300 is held by a contact moving mechanical unit 400, and the contact unit 300 is movable in the direction of the optical axis.

The imaging element 101 receives a light beam incident from the interchangeable lens mounted on the body and converts it into electric signals. A display unit 103 is disposed on the back face of the imaging apparatus 100 and displays captured images and reproduced images. Since the display unit 103 is rotatably mounted on the body, the user can optionally change the position and orientation of the display unit 103 in accordance with the shooting situation.

A grip portion 105 is disposed on the left side surface as viewed from the front and is attached so as to be rotatable with respect to the body around a grip portion pivot shaft 104. The user grips the imaging apparatus 100 and operates various operation units arranged in the grip portion 105.

Figure 7A:
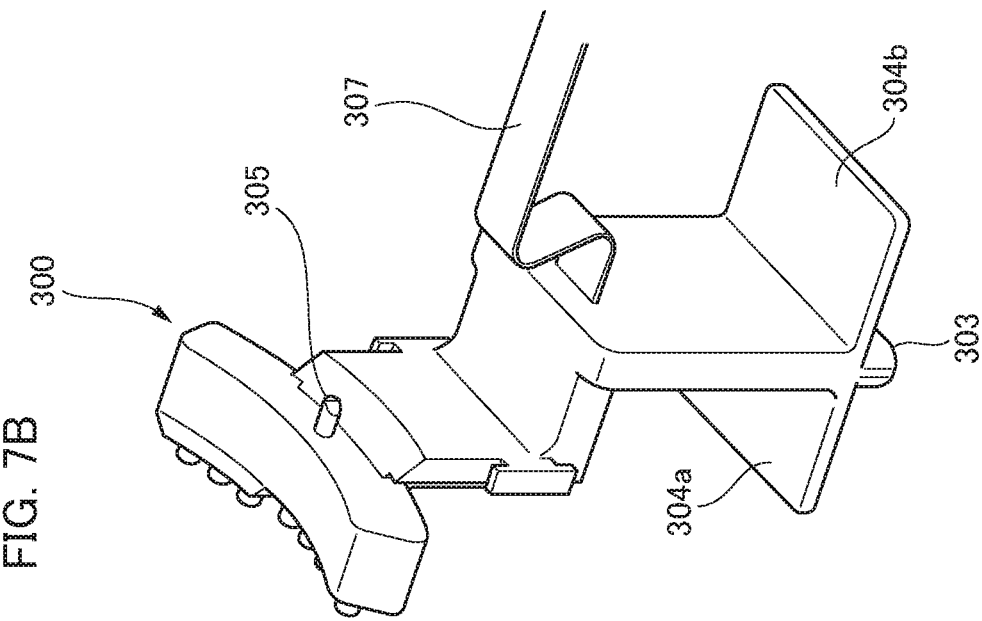
FIGS. 7A and 7B are external perspective views illustrating a configuration of a contact unit of the first example.
Figure 7B:
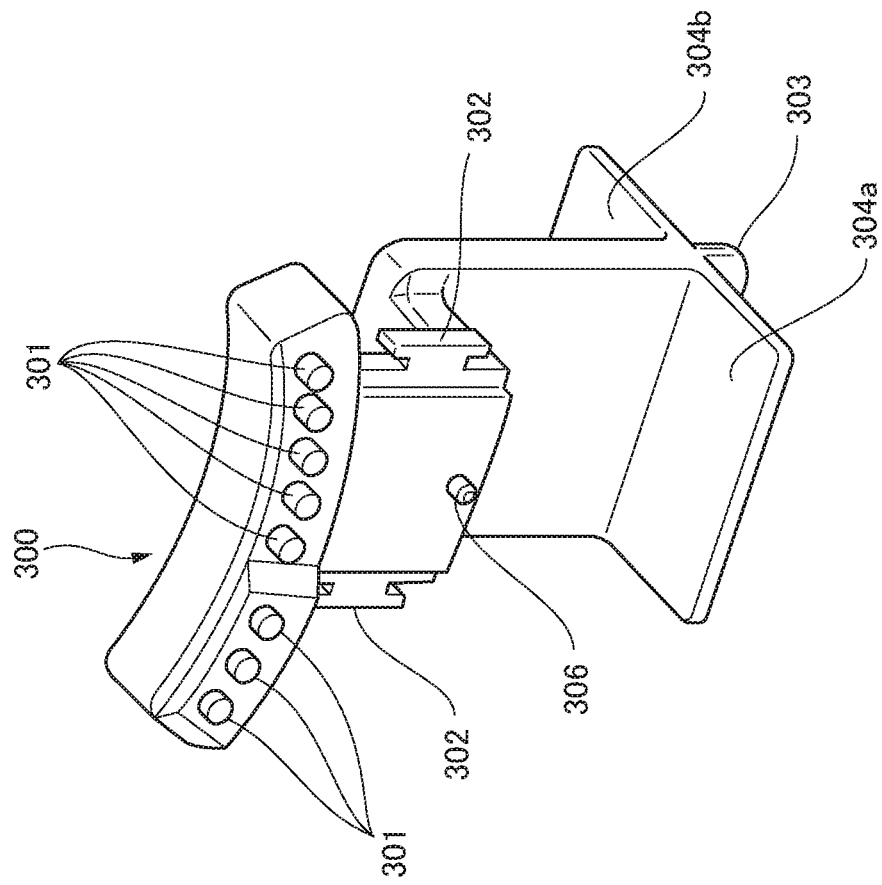
Figure 8:
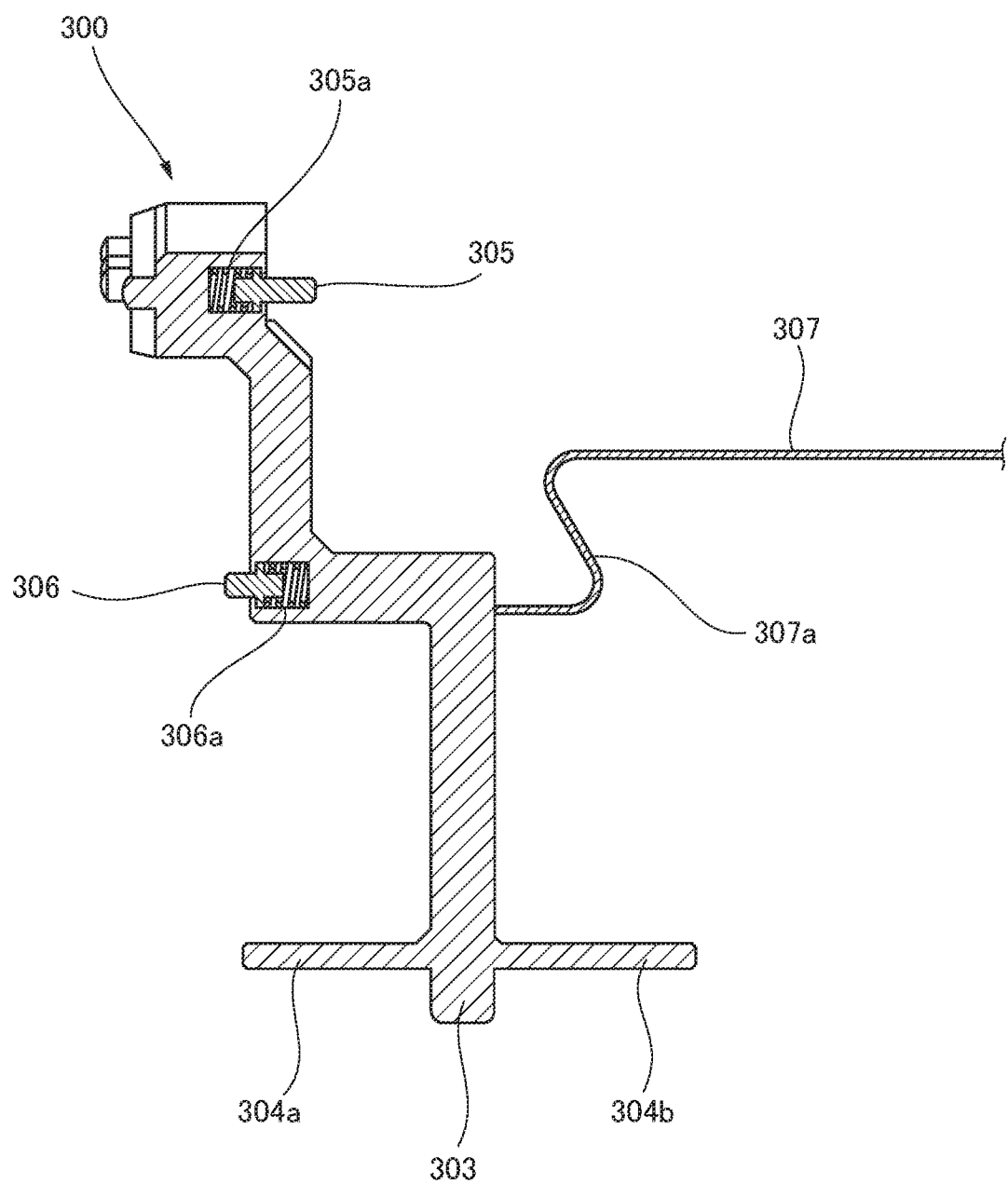
FIG. 8 is a cross-sectional view illustrating the internal structure of the contact unit of the first example.

Next, a description will be given of the contact unit 300 and the contact moving mechanical unit 400. FIG. 7A is an external perspective view illustrating the contact unit 300 as viewed from the front. FIG. 7B is an external perspective view illustrating the contact unit 300 as viewed from the back. FIG. 8 is a sectional view illustrating the internal structure of the contact unit 300. On the front of the contact unit 300, a plurality of first contact portions 301 is arranged. The contact unit 300 includes contact guide portions 302 on both sides. The contact guide portions 302 engage with the contact moving mechanical unit 400 of the imaging apparatus 100 and play a role of regulating the movement in directions other than the direction of the optical axis. A position operation portion 303 is provided at a lower part of the contact unit 300. The position operation portion 303 is a member that operates the contact unit 300 in the imaging apparatus 100 by the user.

On the upper of the position operation portion 303, a plurality of protrusions 304 is formed in the front-back direction. These protrusions 304 are members for engaging with the body of the imaging apparatus 100 to fix the orientation of the contact unit 300. A first protrusion 304*a* protrudes forward and a second protrusion 304*b* protrudes rearward. The protrusions 304*a* and 304*b* prevent the contact unit 300 from inclining forward or backward, so that the first contact portions 301 can be securely brought into contact with the second contact portions of the interchangeable lens.

On the front face and back face of the contact unit 300, lock pins for positioning the first MA 800 and the second MA 900, which will be described later, with respect to the body of the imaging apparatus 100, are disposed. Specifically, a front lock pin 306 is arranged on the front face of the contact unit 300 (FIG. 7A), and a rear lock pin 305 is arranged on the back face (FIG. 7B). If the rear lock pin 305 is urged rearward by a rear pin spring 305*a* and a forward load is applied, an amount of protrusion becomes zero and the pin retracts to a position where the pin does not protrude from the contact unit 300. Additionally, if the front lock pin 306 is urged forward by a front pin spring 306*a* and a rearward load is applied, the amount of protrusion becomes zero and the pin retracts to a position where the pin does not protrude from the contact unit 300.

On the back face of the contact unit 300, an electric connection member 307 for connecting to a substrate (not illustrated) inside the imaging apparatus 100 is provided. The electric connection member 307 is configured of, for example, a flexible wiring member, and has a bent portion 307*a* along the operating direction of the contact unit 300. That is, a part of the electric connection member 307 has a portion bent in an S-shape as viewed from the side, and is drawn inside the imaging apparatus 100. According to this configuration, even if the contact unit 300 moves along the direction of the optical axis, an excessive load is never applied to the electric connection member 307.

Figure 9B:
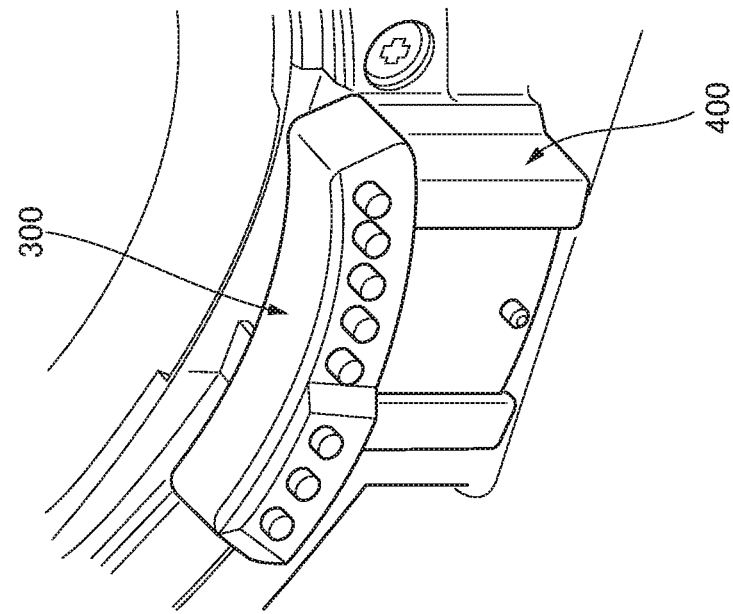
FIGS. 9A and 9B are perspective views illustrating a contact moving mechanical unit of the contact unit of the first example.
Figure 9A:
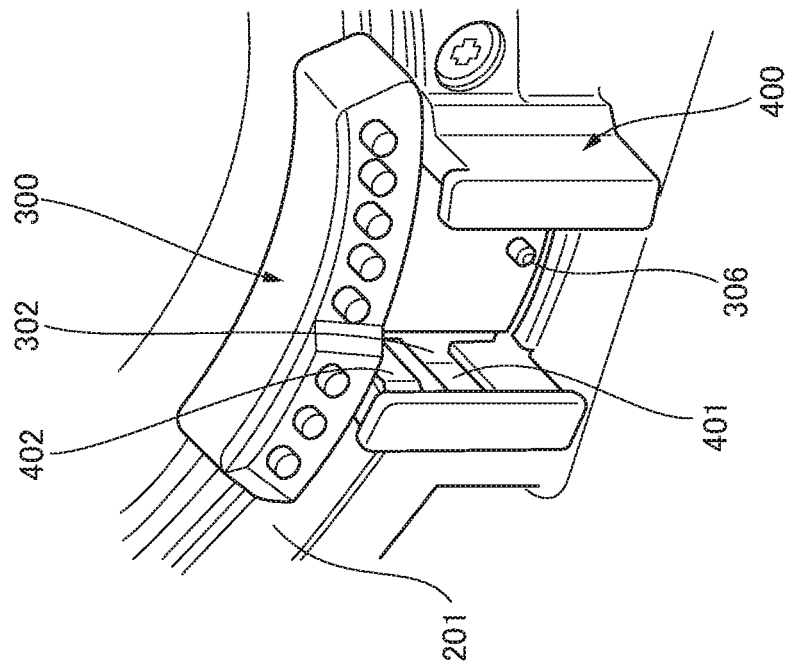

Next, a description will be given of the contact moving mechanical unit 400 of the contact unit 300. FIG. 9A is a perspective view illustrating the contact moving mechanical unit 400 in a state in which the position of the contact unit 300 is the first position (hereinafter, referred to as the "rear position"). FIG. 9B is a perspective view illustrating the contact moving mechanical unit 400 in a state in which the position of the contact unit 300 is the second position (hereinafter referred to as the "front position"). Hereinafter, the state in which the contact unit 300 is in the rear position is referred to as the "retracted state", and the state in which the contact unit 300 is in the front position is referred to as the "advancing state". In the present example, the rear position is the first end position in the moving range of the contact unit 300, and the front position is the second end position in the moving range of the contact unit 300.

The contact moving mechanical unit 400 includes guide rails 401, a leaf spring 402, and a portion to be engaged 403 to be described below. The guide rails 401 are members engaging with the contact guide portions 302 respectively formed on the contact unit 300, and regulates the movement of the contact unit 300 in directions other than the direction of the optical axis. The leaf spring 402 has a function of urging the contact unit 300 to the each of the front position and the rear position so as to fix the positions. The leaf spring 402 is an example of an elastic support that applies an urging force to be attracted to the first or second position if the contact unit 300 is displaced from the first or second position. In FIG. 9A, although one of the guide rails 401 and the leaf spring 402 is shown, these members are arranged in pairs in line symmetry with respect to the optical axis.

Figure 10A:
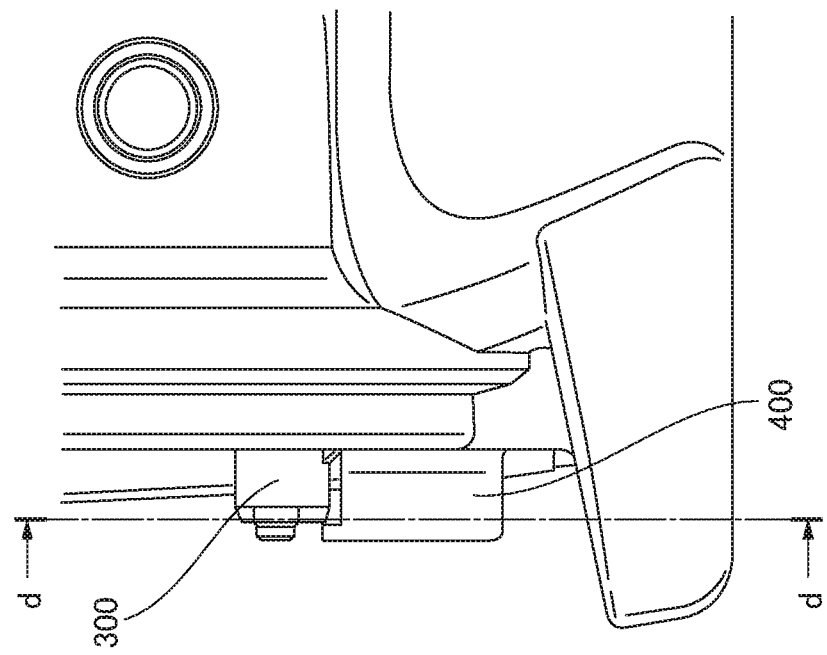
FIGS. 10A and 10B illustrate the appearance of the contact moving mechanical unit of the first example.
Figure 10B:
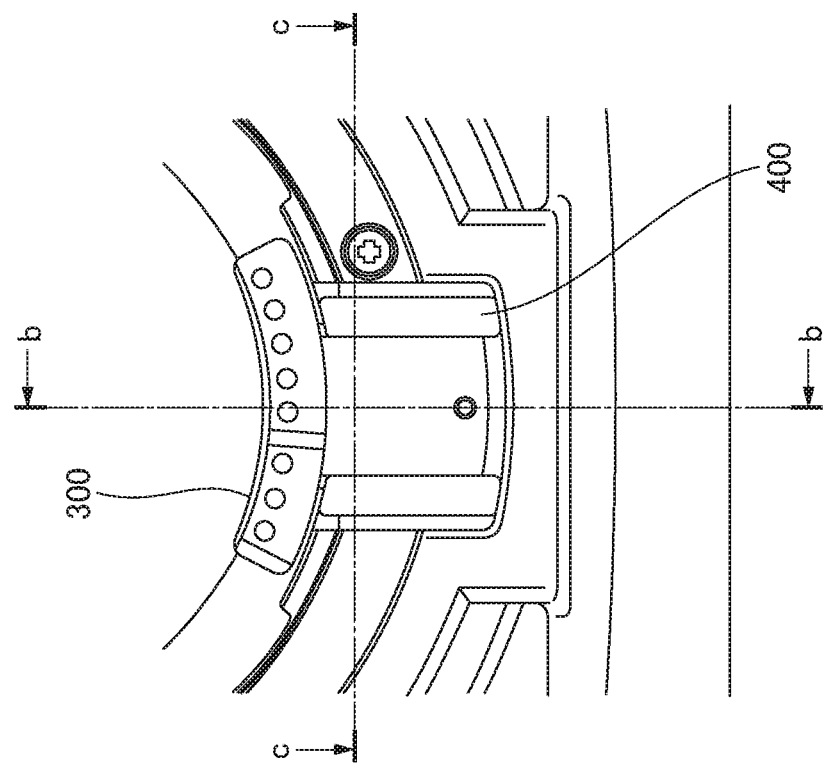
Figure 12:
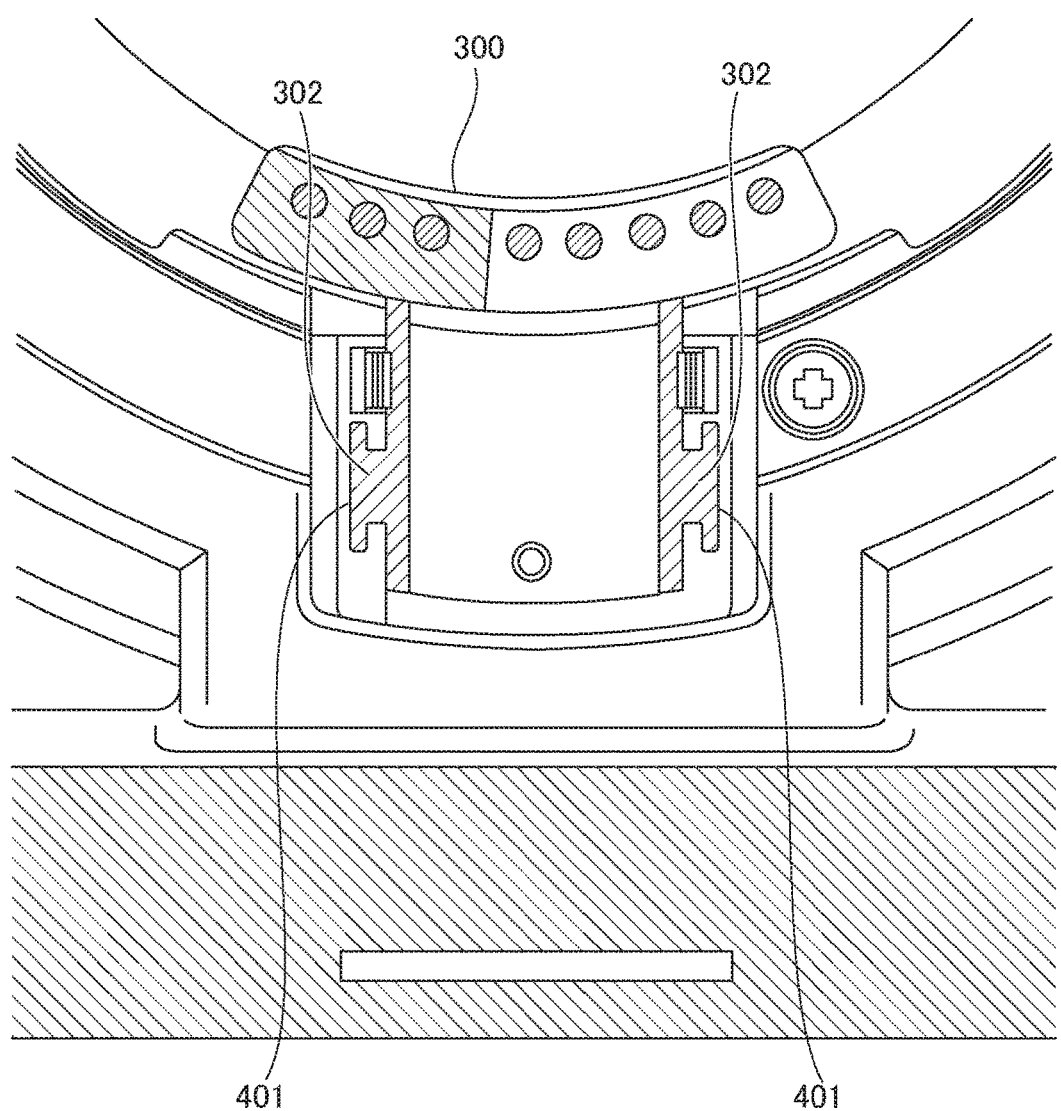
FIG. 12 is a cross-sectional view along the line d-d in FIG. 10B.

FIG. 10A is a front view illustrating the appearance of the contact moving mechanical unit 400 and FIG. 10B is a right side view illustrating an appearance of the contact moving mechanical unit 400. FIGS. 11A and 11B are cross-sectional views taken along the section indicating line b-b of FIG. 10A. FIG. 11A is a cross-sectional view illustrating the contact moving mechanical unit 400 in the retracted state of the contact unit 300. FIG. 11B is a cross-sectional view illustrating the contact moving mechanical unit 400 in the advancing state of the contact unit 300. FIG. 12 is a cross-sectional view taken along the section indicating line d-d of FIG. 10B, and illustrates the structure of the contact moving mechanical unit 400. FIG. 13A is a bottom view of the imaging apparatus 100 illustrating the retracted state of the contact unit 300. FIG. 13B is a bottom view of the imaging apparatus 100 illustrating the advancing state of the contact unit 300.

The position operation portion 303 of the contact unit 300 is exposed from the lower portion of the body of the imaging apparatus 100 (FIGS. 13A and 13B). As shown in FIG. 11A, in the retracted state of the contact unit 300, if the user applies a force forward to the position operation portion 303, the entire contact unit 300 slides forward. Conversely, as shown in FIG. 11B, if the user rearward applies a force to the position operation portion 303 in the advancing state of the contact unit 300, the entire contact unit 300 slides rearward. The first and second protrusions 304 of the contact unit 300 respectively protrude in the front-rear direction, and are respectively accommodated in the portions to be engaged 403 formed on the body in accordance with the slide position of the contact unit 300. The portions to be engaged 403 each have a recessed portion in conformity with the shape of the protrusions 304 in the front-rear direction. The first protrusion 304a (a front protrusion) engages with a front portion to be engaged 403a and the second protrusion 304b (a rear protrusion) engages with a rear portion to be engaged 403b to stabilize the orientation with respect to the imaging apparatus 100 during the movement of the contact unit 300.

As shown in FIG. 12, the contact guide portions 302 of the contact unit 300 are each fitted into the plurality of guide rails 401, so that the moving direction of the contact unit 300 is regulated. The operation opening portion 106 shown in FIGS. 13A and 13B is a hole portion formed on the lower surface of the body, from which the position operation portion 303 is exposed downwardly. The width of the operation opening 106 in the direction of the optical axis is formed to exceed the moving range of the position operation portion 303. Accordingly, even if the contact unit 300 is in the advancing state and the retracting state located at the ends of its moving range, the position operation portion 303 does not contact the operation opening unit 106 on the plane orthogonal to the direction of the optical axis. Moreover, as shown in FIGS. 11A and 11B, even if the contact unit 300 is at the end of its moving range, the length of the protrusion 304 is set such that the protrusion 304 fits to the portion to be engaged 403 at both front and rear positions. As a result, as shown in FIGS. 13A and 13B, a part of the position operation portion 303 and the protrusions 304 is exposed on the outside from the operation opening portion 106. A configuration in which the internal structure of the imaging apparatus 100 is shielded so as not to be seen from the outside is given.

Figure 14A:
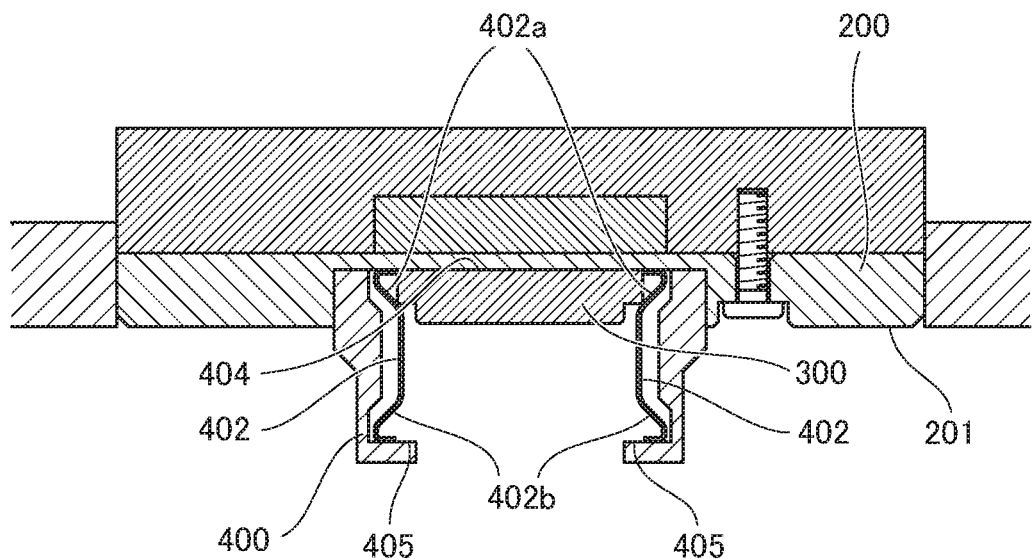
FIGS. 14A and 14B are cross-sectional views taken along the line c-c in FIG. 10A.
Figure 14B:
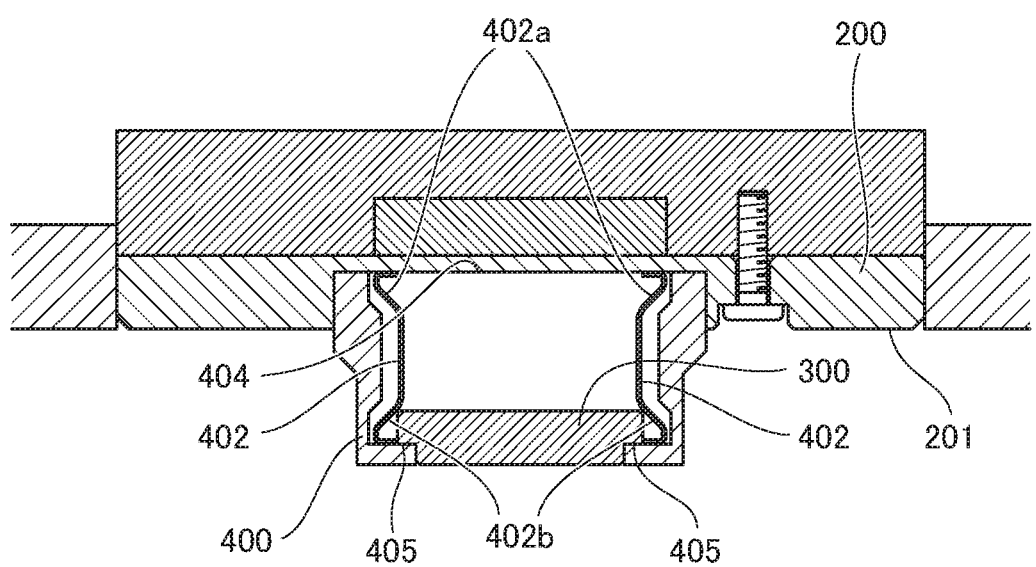

FIGS. 14A and 14B are cross-sectional views taken along the section indicating line c-c of FIG. 10A. FIG. 14A is a cross-sectional view illustrating the contact moving mechanical unit 400 in the retracted state of the contact unit 300. FIG. 14B is a cross-sectional view illustrating the contact moving mechanical unit 400 in the advancing state of the contact unit 300. In the retracted state of the contact unit 300, the contact unit 300 comes into contact with the rear abutting surface 404. Leaf springs 402 each have rear tilt portions 402a, and in the retracted state, a force that urges the contact unit 300 rearward is applied by the rear tilt portions 402a.

In FIGS. 14A and 14B, in a case where the user operates the position operation portion 303 (not illustrated) and the forward operation force is applied, if the contact unit 300 moves from the rear position to the front position, a load is applied to the leaf springs 402. The leaf spring 402 is a member obtained by bending a metal thin plate such as stainless steel, and is deformed under a constant load. If the operation force of the user exceeds the predetermined value (threshold), the rear tilt portions 402a are sufficiently deformed, the contact unit 300 is not subjected to the rearward urging force from the rear tilt portions 402a, and the contact unit 300 slides to the front position to come into contact with a front abutting surface 405 (advancing state).

The leaf spring 402 has a front tilt portions 402b, and in the advancing state of the contact unit 300, a force that urges the contact unit 300 forward is applied by the front tilt portions 402b. In a case where the user operates the position operation portion 303 and a forward operation force is applied, if the contact unit 300 moves from the front position to the rear position, the front tilt portions 402b are sufficiently deformed if the user's operating force exceeds a predetermined value. Accordingly, the contact unit 300 does not receive a forward biasing force from the front tilt portions 402b, and the contact unit 300 slides toward the rear position to come into contact with the rear contact surface 404 (retracted state).

In the present example, although the moving mechanical unit of the contact unit 300 in response to the manual operation by the user is exemplified, the movement of the contact unit 300 may be realized by an actuator. In this case, the control unit in the body performs the drive control of the actuator by using signals obtained by the user's operation of the operation member provided in the imaging apparatus 100 to serve as trigger signals, and the contact unit 300 is moved to the predetermined position.

Subsequently, a description will be given of the structure of the mount adapter to be mounted on the imaging apparatus 100 and the imaging apparatus 100 that fixes the mount adapter. Hereinafter, the mount adapter fixed to the mount portion in the retracted state of the contact unit 300 is referred to as the "first MA 800". Additionally, the mount adapter fixed to the mount section in the advancing state of the contact unit 300 is referred to as the "second MA 900".

Figure 15B:
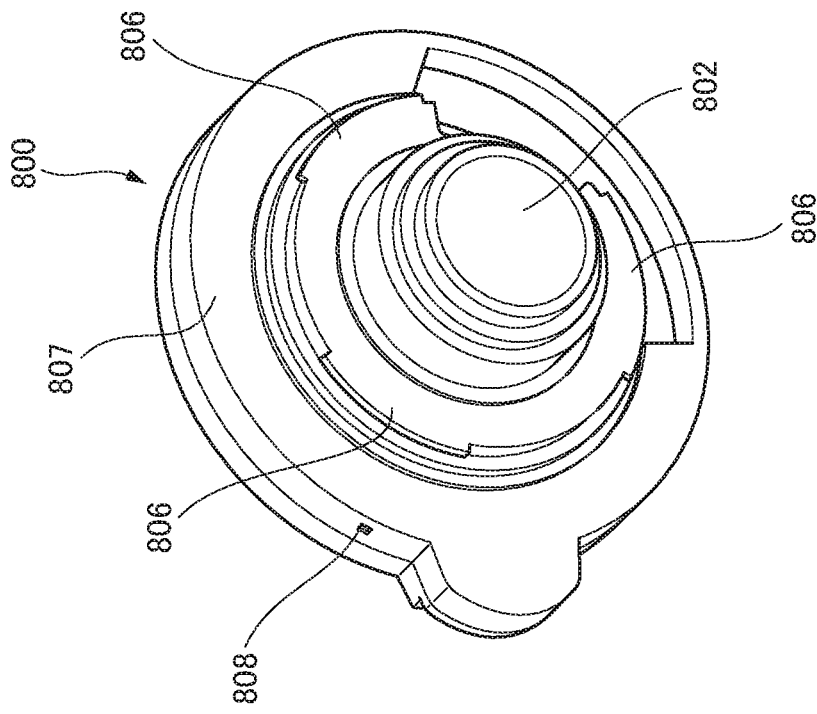
FIGS. 15A and 15B are external perspective views illustrating a first mount adapter.
Figure 15A:
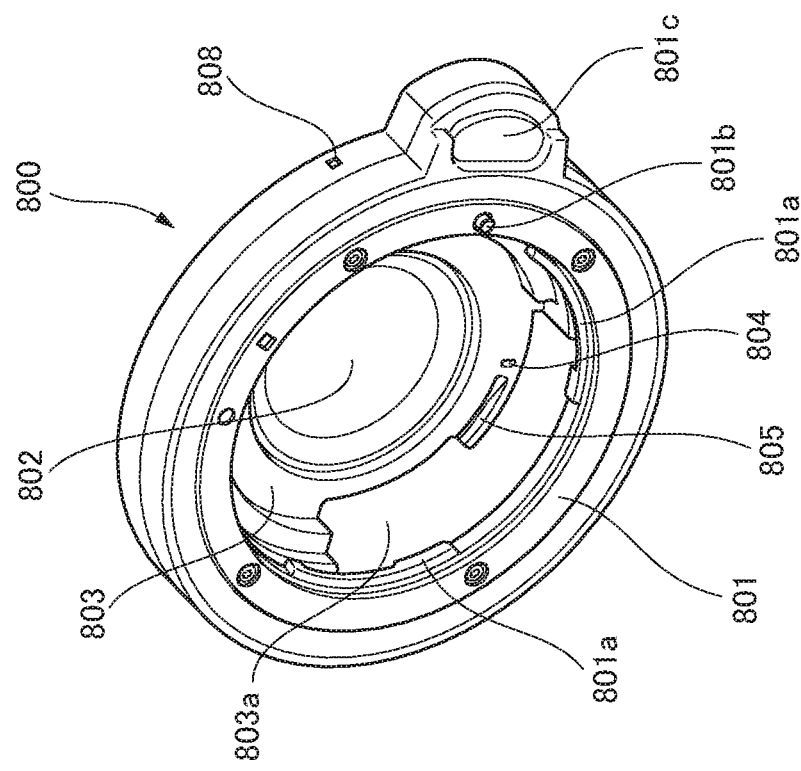

FIG. 15A is an external perspective view of the first MA 800 as viewed from the front. FIG. 15B is an external perspective view of the first MA 800 as viewed from the back. The first MA 800 includes a lens mounting portion 801 at the front, and it is possible to mount the interchangeable lens. The lens mounting portion 801 includes a plurality of lens mounting catches 801a and the lens mounting catches 801a are respectively fitted into a plurality of mounting catches formed on the interchangeable lens. A lock pin 801b provided on the front of the lens mounting portion 801 is a member for determining a mounting phase of the interchangeable lens to be mounted on the first MA 800. The protrusion amount of the lock pin 801b is adjustable in accordance with the operation of a lens release knob 801c. Since the structures of the lens mounting catches 801a, the lock pin 801b, and the lens release knob 801c are well known, detailed description thereof will be omitted.

The first MA 800 internally includes a conversion lens 802. For example, in the conversion lens 802 configuring a reduction optical system, incident light rays from the interchangeable lens mounted on the first MA 800 are collected to form an image at the central portion of the imaging element 101. An effect of lowering the F value can be obtained by the collected effect of the conversion lens 802. Additionally, in the conversion lens 802 configuring an enlargement optical system, an enlarged image in which the focal length is extended can be obtained in the imaging element 101 due to the diffusion effect on the incident light from the interchangeable lens mounted on the first MA 800.

An adapter cylinder 803 is a member that holds the conversion lens 802, and includes a mount lock groove 804 and a lock pin guide 805. The adapter cylinder 803 includes a cutout portion 803*a* for preventing interference with the contact unit 300 of the imaging apparatus 100 during the mounting the first MA 800. The function of the lock pin guide 805 will be described with reference to FIG. 17 and the following drawings.

The first MA 800 has mount catches 806 and a mount surface 807 on its back face. The mount surface 807 is in contact with the mount surface 201 of the body, and the mount catches 806 each engage with the mount catches 202 of the imaging apparatus 100 at the time of mounting. Additionally, the first MA 800 has an insertion index 808 in order to match the index in accordance with the insertion index 102 of the imaging apparatus 100.

If the user mounts the first MA 800 on the imaging apparatus 100, the operation is performed as below. Since the first MA 800 is fixed by the contact unit 300 located at the rear position, the user first confirms that the contact unit 300 is in the rear position in the imaging apparatus 100. If the position of the contact unit 300 is not in the rear position, the user moves the contact unit 300 to the rear position by operating the position operation portion 303. Then, the user sets the mount surface 201 and the mount surface 807 so as to face each other, and align the insertion index 102 and the insertion index 808 with each other. Note that the cutout portion 803*a* is formed so as not to contact the first MA 800 with the contact unit 300 during this operation. In this state, the mount catches 202 of the imaging apparatus 100 and the mount catches 806 of the first MA 800 are set so as to have a complementary positional relation with each other. Hence, if the operation of inserting the rear end of the first MA 800 into the opening of the mount section 200 is performed, the mount catches 806 of the first MA 800 pass through the mount catches 202 of the imaging apparatus 100 and are entered behind the mount surface 201. FIG. 16A is a perspective view illustrating a state in which the mount surface 807 of the first MA 800 and the mount surface 201 of the imaging apparatus 100 are in contact with each other at the time of mounting of the first MA 800.

Subsequently, the user rotates the first MA 800 in the clockwise direction as viewed from the front, around the optical axis. As a result, the mount catches 806 of the first MA 800 enter behind the mount catches 202 of the imaging apparatus 100, and the catches engage with each other. Since at least one of the mount catches 202 and 806 is formed with a slight taper, the mount surface 807 is drawn rearward in the direction of the optical axis with the rotation of the first MA 800, and finally the mount surfaces are brought into close contact with each other. FIG. 16B is a perspective view illustrating a state in which the mounting of the first MA 800 on the imaging apparatus 100 is completed. In this state, since the rear lock pin 305 of the contact unit 300 is fitted into the mount lock groove 804, the first MA 800 cannot move in the rotation direction.

Figure 17:
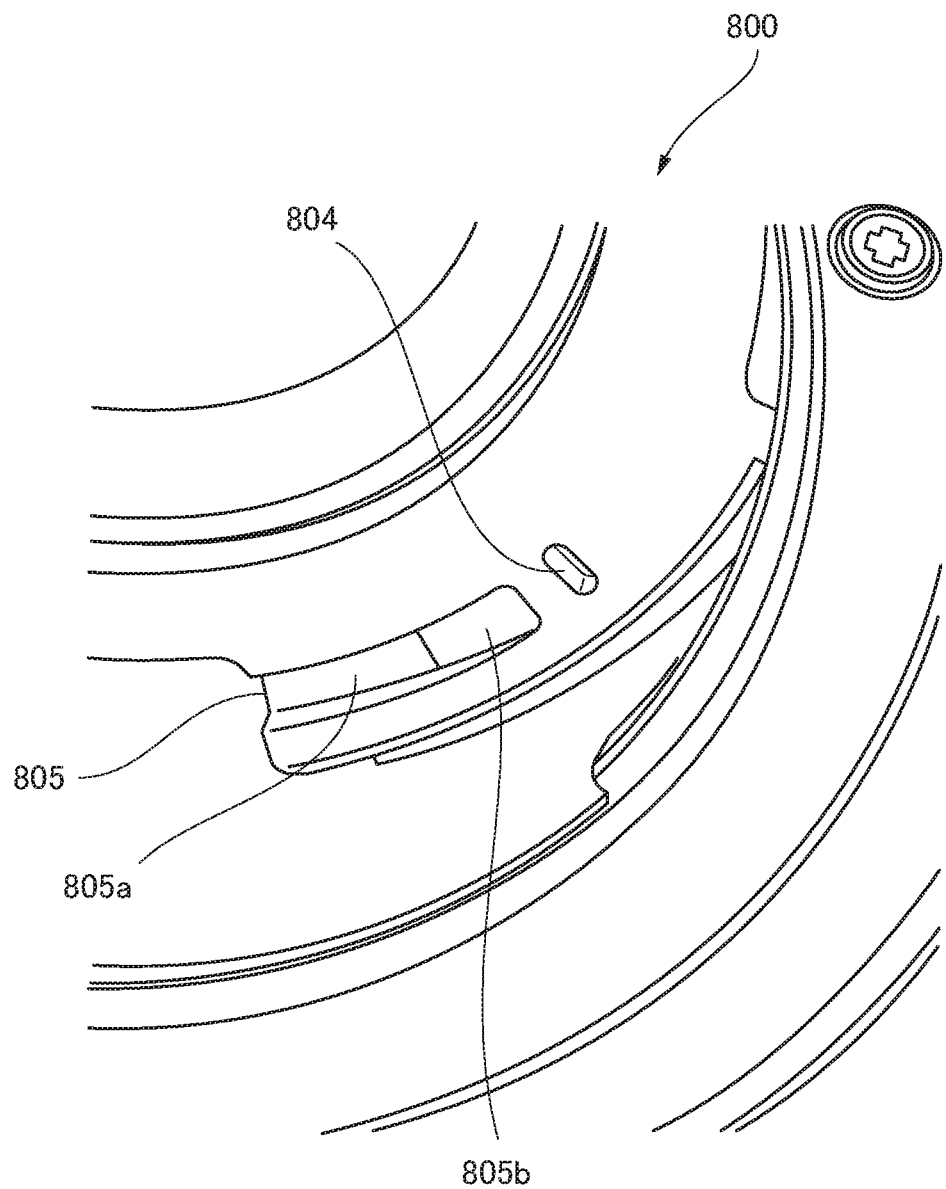
FIG. 17 is a detailed view illustrating structures of a mount lock groove and a lock pin guide of the first mount adapter.

The operation of the rear lock pin 305 with respect to the mount lock groove 804 and the lock pin guide 805 in the rotation operation of the first MA 800 will be described with reference to FIG. 17 to FIG. 20. FIG. 17 is a detailed view illustrating a structure of the mount lock groove 804 and the lock pin guide 805 in the first MA 800. At a position close to the mount lock groove 804, an arc-shaped lock pin guide 805 is formed along the optical-axis rotational direction. The lock pin guide 805 is formed by a guide flat portion 805*a* and a guide slope portion 805*b*, and the guide slope portion 805*b* is located closer to the mount lock groove 804.

FIGS. 18A to 18D are front views of the principal part illustrating a positional relation between the rear lock pin 305, the mount lock groove 804, and the lock pin guide 805 with the rotation operation of the first MA 800. From FIG. 18A to FIG. 18D, a state in which the rear lock pin 305, the mount lock groove 804, and the lock pin guide 805 relatively move is illustrated. FIG. 19A to FIG. 19D are cross-sectional views taken along the section indicating lines, a-a, b-b, c-c, and d-d shown in each of FIGS. 18A to 18D. FIGS. 20A to 20D are longitudinal sectional views of the principal part in each state illustrated in FIGS. 18A to 18D. Each state is as follows.

Figure 19A:
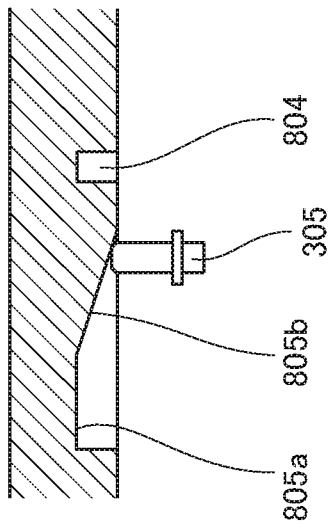
FIGS. 19A to 19D are each schematic cross-sectional views taken along the cross-section indicating line shown in FIG. 18.
Figure 20B:
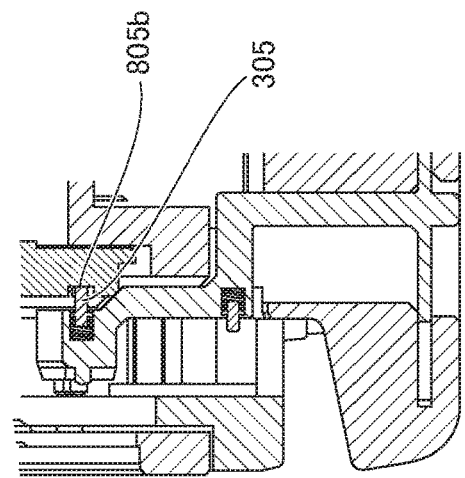
FIGS. 20A to 20D are cross-sectional views illustrating a relation between the rear lock pin, the mounting lock groove, and the lock pin guide.
Figure 20D:
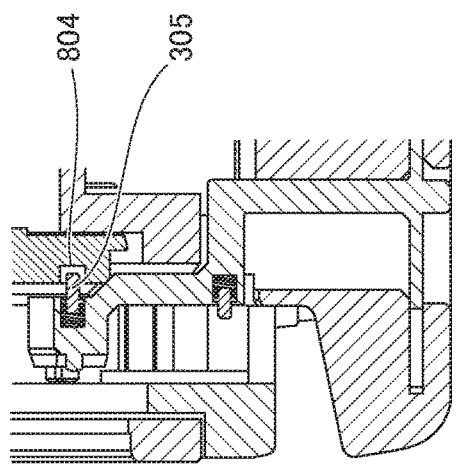
Figure 20A:
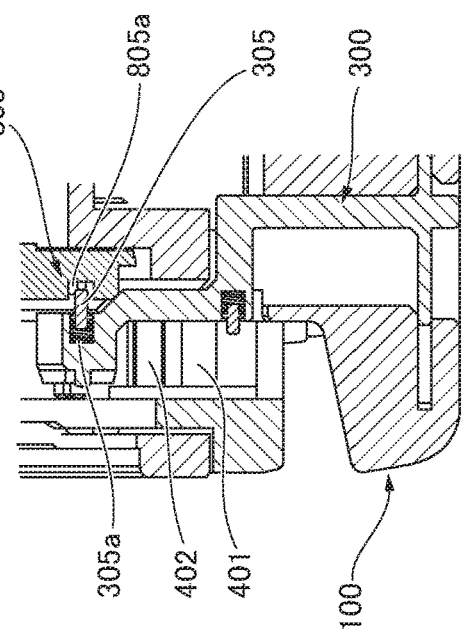

In the first state shown in FIG. 18A, FIG. 19A, and FIG. 20A, the rear lock pin 305 is positioned on the guide flat portion 805*a*.

Figure 19B:
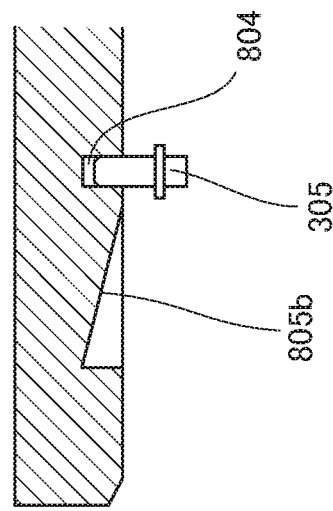

In the second state shown in FIG. 18B, FIG. 19B, and FIG. 20B, the rear lock pin 305 is positioned on the guide slope portion 805*b*.

Figure 19C:
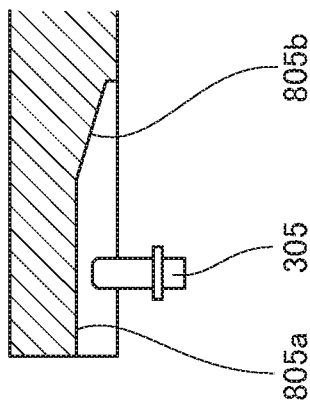
Figure 20C:
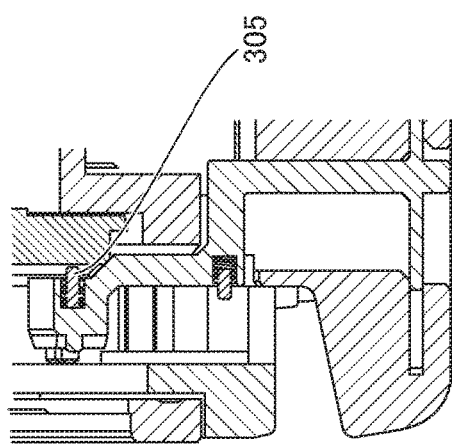

In the third state shown in FIG. 18C, FIG. 19C, and FIG. 20C, the rear lock pin 305 is positioned between the guide slope portion 805*b* and the mount lock groove 804.

Figure 19D:
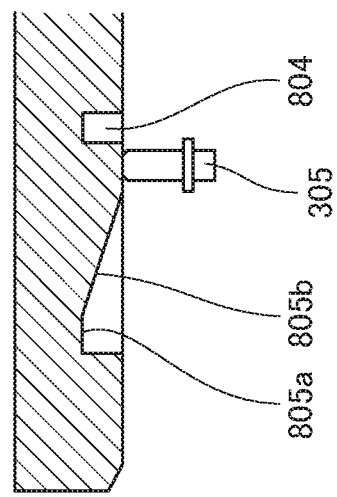

In the fourth state shown in FIG. 18D, FIG. 19D, and FIG. 20D, the rear lock pin 305 engages with the mount lock groove 804.

In the first state, the rear lock pin 305 is positioned on the guide flat portion 805*a* and is urged rearward by the rear pin spring 305*a*. If the first MA 800 further rotates from this state, the second state is obtained. The rear lock pin 305 is positioned on the guide slope portion 805*b* and moves forward under a load from the guide slope portion 805*b*. That is, the rear lock pin 305 moves forward following the slope of the guide slope portion 805*b*.

If the first MA 800 further rotates from the second state, the third state is obtained, and the rear lock pin 305 is positioned between the guide slope portion 805*b* and the mount lock groove 804. In the third state, the rear lock pin 305 moves in the most front position. In the fourth state, no load is applied to the rear lock pin 305 from the adapter cylinder 803, and the rear lock pin 305 enters the mount lock groove 804 due to a biasing force of the rear pin spring 305*a*. The width of the mount lock groove 804 (the width in the direction orthogonal to the circumferential direction) is set to the same as the diameter of the rear lock pin 305, or set within a range in which the difference between them has been set in advance. In the fourth state, the rotation of the first MA 800 in the optical-axis rotational direction with respect to the imaging apparatus 100 is regulated by the engagement of the rear lock pin 305 and the mount lock groove 804. Therefore, in addition to the moving regulation in the direction of the optical axis due to the engagement between the mount catches 202 and the mount catches 806 described above, the first MA 800 is fixed to the imaging apparatus 100.

In contrast, if the first MA 800 is removed from the body, the user operates the position operation portion 303 of the contact unit 300 to move the contact unit 300 to the front position. Since the protruding amount of the rear lock pin 305 from the contact unit 300 is smaller than the moving amount of the contact unit 300, the fit between the rear lock pin 305 and the mount lock groove 804 becomes detached and the fixed state is released. Since the first MA 800 becomes rotatable in the counterclockwise direction around the optical axis, the user can remove the first MA 800 from the body by performing the above-described series of operations in the reverse order.

Figure 21A:
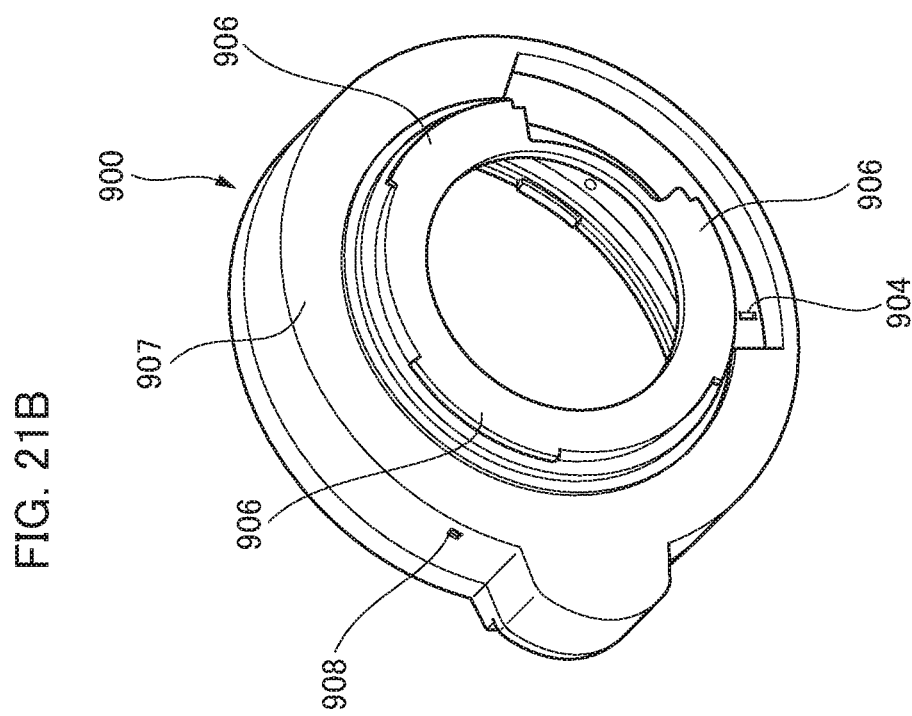
FIGS. 21A and 21B are external perspective views illustrating a second mount adapter.
Figure 21B:
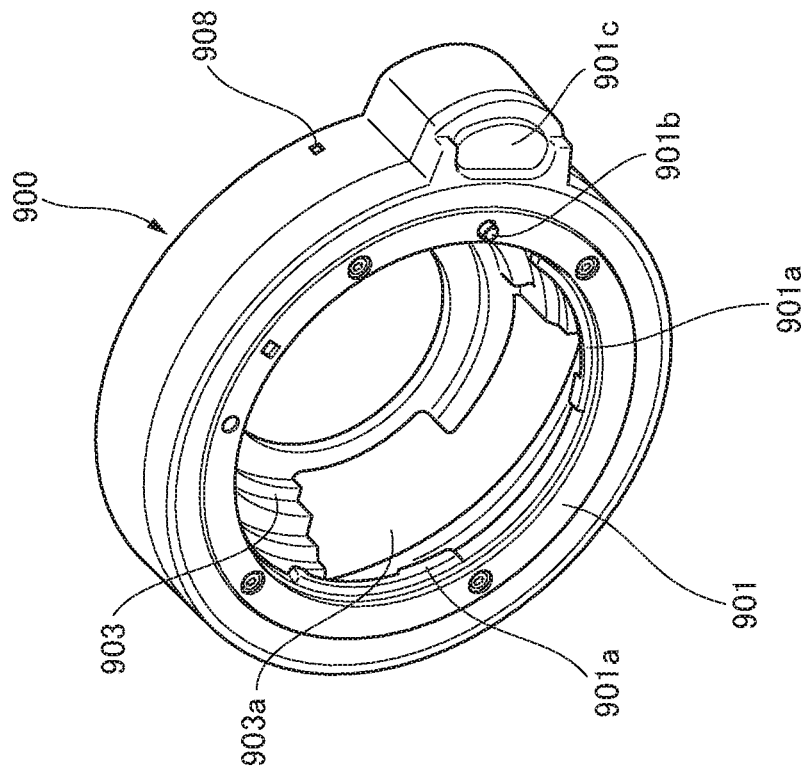

With reference to FIGS. 21A and 21B, the second MA 900 will be described. FIG. 21A is an external perspective view of the second MA 900 as viewed from the front. FIG. 21B is an external perspective view of the second MA 900 as viewed from the back. A lens mounting portion 901 is provided on the front of the second MA 900. A plurality of lens mounting catches 901a, a lock pin 901b formed on the front portion, and a lens release knob 901c are included. The inside of the second MA 900 is configured by an adapter cylinder 903, and a plurality of mount catches 906 and a mount surface 907 are formed on the back face of the second MA 900. The mount surface 907 is in contact with the mount surface 201 of the body, and the mount catches 906 respectively engage with the mount catches 202 of the imaging apparatus 100 during mounting.

A cutout portion 903a is formed on the adapter cylinder 903 for preventing interference with the contact unit 300 during the mounting of the second MA 900 on the body. Unlike the first MA 800, a mount lock groove 904 is disposed on the back face of the adapter cylinder 903. There is an insertion index 908 on the side portion of the second MA 900.

Figure 22A:
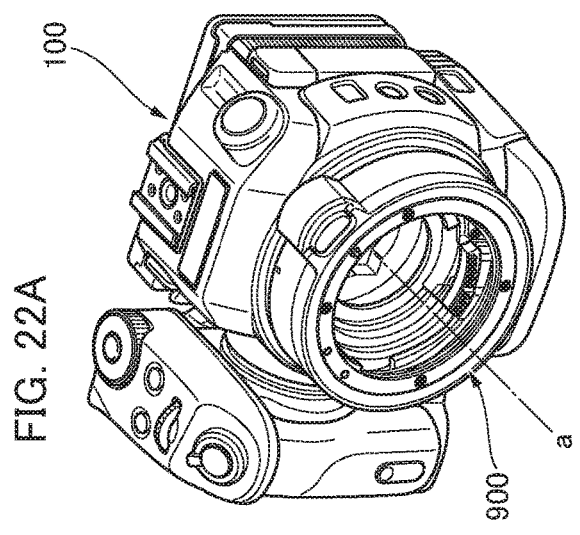
FIGS. 22A to 22D are perspective views and the sectional view of the principal part illustrating a state in which the second mount adapter is mounted on the imaging apparatus.
Figure 22B:
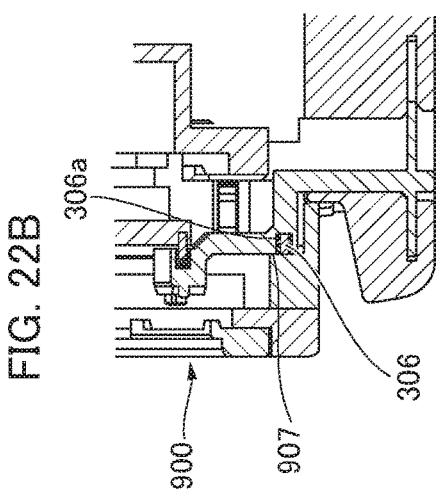

An operation of mounting the second MA 900 on the imaging apparatus 100 will be described. Note that matters duplicating the case of the mounting operation of the first MA 800 will appropriately be omitted. First, in the imaging apparatus 100, the user confirms that the contact unit 300 is in the front position. If the contact unit 300 is not in the front position, the user operates the position operation portion 303 to move the contact unit 300 to the front position. In this state, the user brings the mount surface 201 and the mount surface 907 into contact with each other while aligning the insertion index 102 and the insertion index 908. FIGS. 22A and 22A illustrate a state in which the mount surfaces are brought into contact with each other in the mounting operation of the second MA 900 on the body. FIG. 22A is an external perspective view as viewed from the front. FIG. 22B is a longitudinal sectional view of the principal part illustrating a state of the front lock pin 306 in FIG. 22A. Since the front lock pin 306 is pushed rearward by the mount surface 907, the front pin spring 306a is in a contracted state, and the front end of the front lock pin 306 is into contact with the mount surface 907.

Figure 22C:
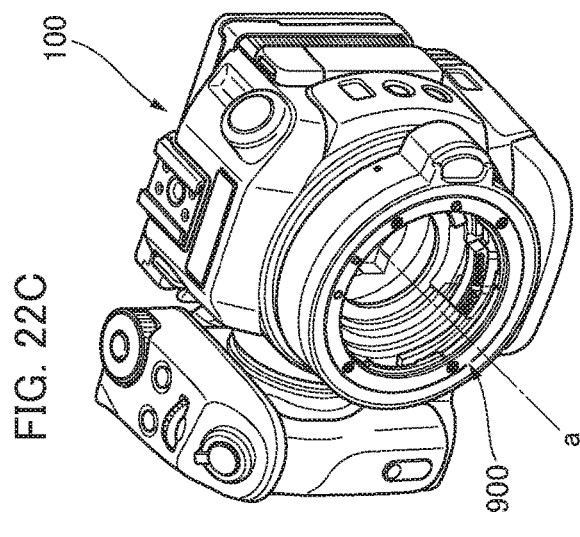
Figure 22D:
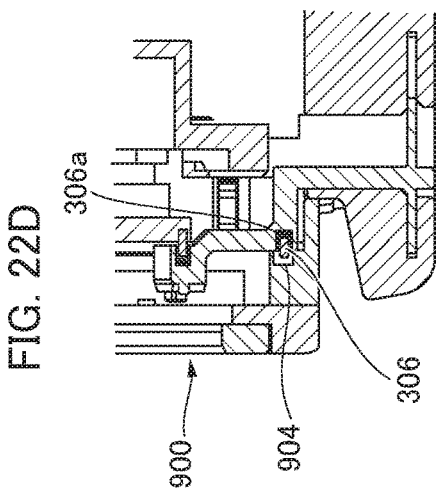

Subsequently, if the user rotates the second MA 900 in the clockwise direction as viewed from the front around the optical axis, the mount catches 906 of the second MA 900 engages with the mount catches 202 of the imaging apparatus 100 with this rotation. If the rotation amount of the second MA 900 reaches the predetermined rotation amount due to the rotation operation of the second MA 900, the front lock pin 306 and the mount lock groove 904 are in the same position in the rotation direction (circumferential direction). This state is shown in FIGS. 22C and 22D. FIG. 22C is an external perspective view as viewed from the front. FIG. 22D is a longitudinal sectional view of the principal part illustrating the state of the front lock pin 306 in FIG. 22C. In this state, no rearward load is applied to the front lock pin 306, and the front lock pin 306 is fitted into the mount lock groove 904 and protrudes. Hence, the movement of the second MA 900 in the rotational direction is regulated and the second MA 900 is in a fixed state with respect to the imaging apparatus 100.

In contrast, if the second MA 900 is removed from the body, the user operates the position operation portion 303 of the contact unit 300 to move the contact unit 300 to the rear position. Since the protrusion amount of the front lock pin 306 from the contact unit 300 is smaller than the moving amount of the contact unit 300, the fit between the front lock pin 306 and the mount lock groove 904 is detached. Since the second MA 900 is rotatable around the optical axis in the counterclockwise direction as viewed from the front, the user can remove the second MA 900 from the body by performing the above-described series of operations in the reverse order.

Based on the above matters, referring to FIGS. 23A to 23F, the procedure of mounting the second MA 900 on the body from the state in which the first MA 800 is mounted on the body and the reverse procedure will be described. FIGS. 23A to 23F are cross-sectional views illustrating a state change of the contact unit 300 and the mount adapter at the time of exchanging the mount adapters.

The user can mount the first MA 800 by the above-described operation in the retracted state of the contact unit 300 shown in FIG. 23A (FIG. 23B). If the first MA 800 is removed in this state, the user first performs an operation of moving the contact unit 300 to the front position (FIG. 23C). In the advancing state of the contact unit 300, the first MA 800 is removed from the body by the operation of rotating the first MA 800 in the counterclockwise direction as viewed from the front (FIG. 23D). In this state, since the position of the contact unit 300 is already in the front position, the user can perform the mounting operation of the second MA 900. The user mounts the second MA 900 (FIG. 23E) and rotates the second MA 900 in the clockwise direction as viewed from the front. If the second MA 900 is removed from the body, the user moves the contact unit 300 to the rear position (FIG. 23F). If the user rotates the second MA 900 in the counterclockwise direction and removes it from the imaging apparatus 100 in the retracted state of the contact unit 300, the state returns to the state shown in FIG. 23A so as to be a state in which the first MA 800 is mountable.

In the present example, the moving operation of the contact unit for an electrical connection between the body of the imaging apparatus and the interchangeable lens, and the locking operation and releasing operation of the mount adapter in the rotation direction are performed in synchronization, thereby simplifying the exchange operation of the adapters. Therefore, the user can exchange the mount adapters quickly.

Modification

Figure 24:
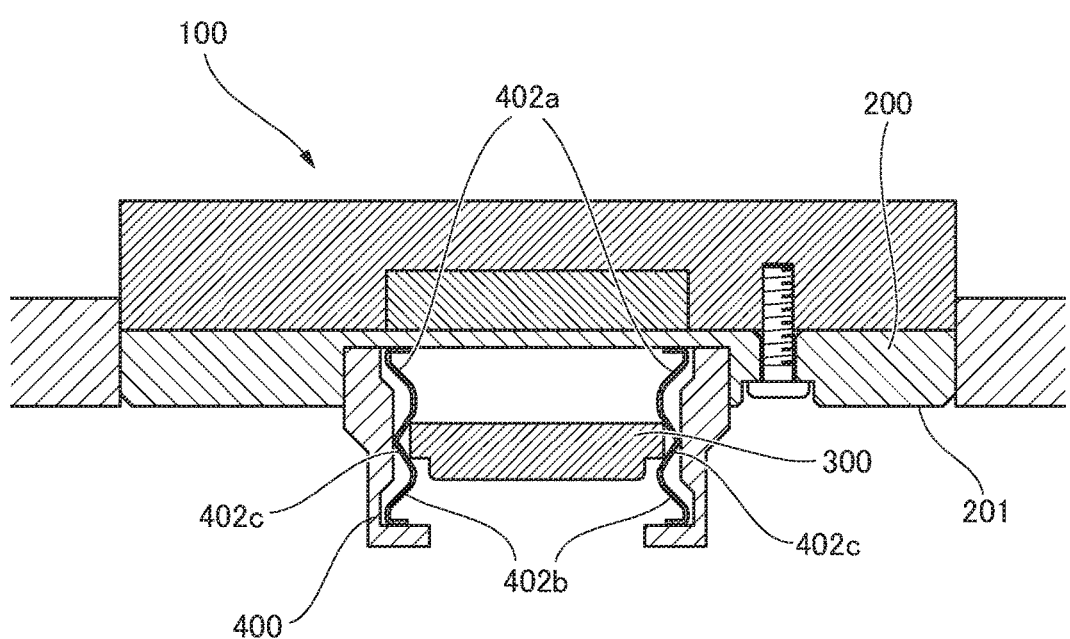
FIG. 24 is a cross-sectional view of a principal part that illustrates the contact moving mechanical unit according to a modification of the first example.

With reference to FIG. 24, a modification according to the first example will be described. FIG. 24 is a schematic sectional view of the portion the same as FIGS. 14A and 14B. In the modification, the shape of the leaf spring 402 is different from that in the first example. The leaf spring 402 includes rear tilt portions 402a and front tilt portions 402b, and further includes central recessed portions 402c. The central recessed portions 402c are located between the rear tilt portions 402a and the front tilt portions 402b in the direction of the optical axis. In the modification, the contact unit 300 can be positioned in the third position (intermediate position) in addition to the rear position and the front position by providing the central recessed portions 402c. The contact unit 300 can be fixed at the third position, so that the first contact portions 301 of the contact unit 300 can be electrically connected to the object to be mounted that is in contact with the second connection portion at the third position. That is, an extension to three types of different objects to be mounted corresponding to each of the first to third positions is possible. Furthermore, it is possible to realize usage forms that can correspond to the mounting of four or more types of objects to be mounted by providing a plurality of recessed portions between the rear tilt portions 402a and the front tilt portions 402b. Accordingly, the position of the contact of the contact unit that is movable by the moving mechanical unit in the direction of the optical axis of the imaging optical system is one of the following.
(1) A plurality of positions at which the contacts of the contact unit respectively contact the contacts of the interchangeable lenses to be mounted on the body via the mount adapter
(2) A plurality of positions at which the contacts of the contact unit respectively contact the contacts of the interchangeable lenses to be mounted on the mount portion of the body not via the mount adapter
(3) A plurality of positions including the positions described in (1) and (2)

The present invention can be realized in various embodiments by appropriately combining a plurality of elements disclosed in each embodiment. Additionally, some of the elements shown in each embodiment may be deleted. For example, the contact unit 300 may have a structure that stabilizes the orientation of the contact unit 300 with only the contact guide 302, without the protrusions 304.

Second Example

Next, a second example of the present invention will be described. In the present example, the same reference numerals as those in the first example are used for the same constituent elements, and the detailed description thereof will be omitted, and mainly the differences will be described.

Figure 25:
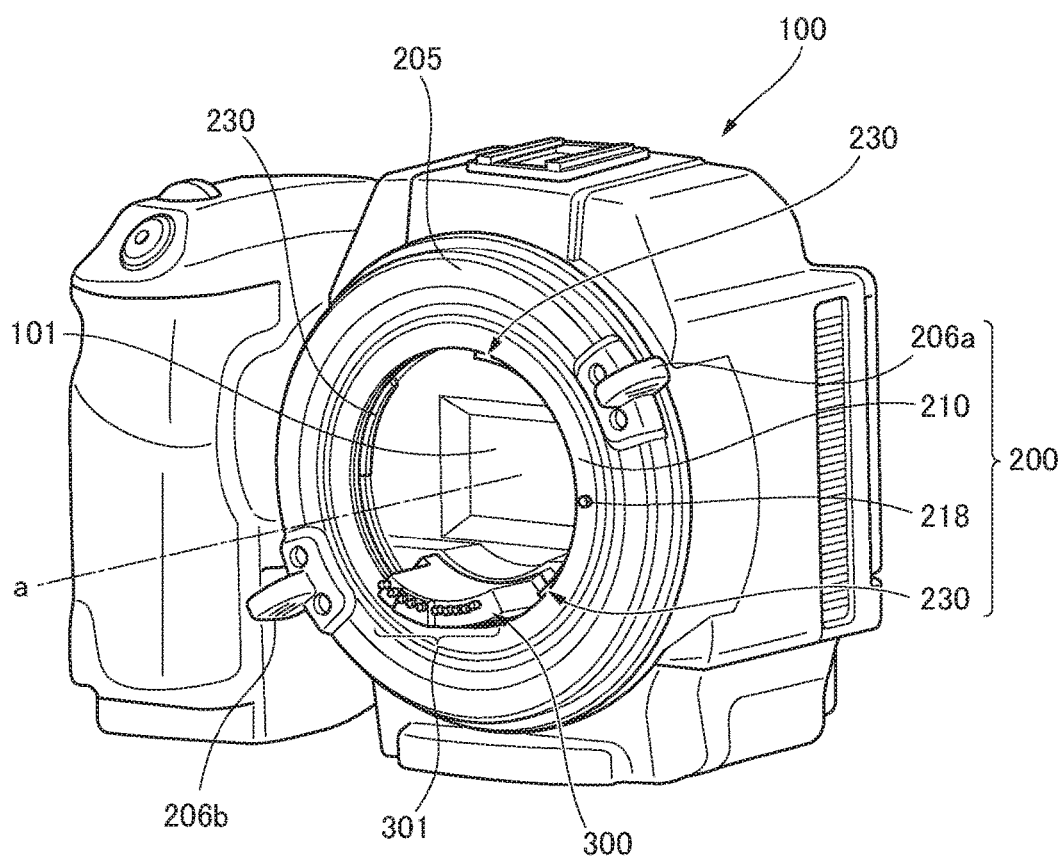
FIG. 25 is an external perspective view of the imaging apparatus according to the second example.

FIG. 25 is an external perspective view of the imaging apparatus 100. The imaging apparatus 100 includes a mount section 200 on its front. The mount section 200 has a mount surface 210 and a plurality of mount catches 230 that are rotatable in the circumferential direction (radial direction) around the optical axis. The mount catches 230 rotate integrally with a mount operation unit 205. A body side lock pin 218 protruding forward is provided on the mount surface 210. The body side lock pin 218 is a member that regulates the position in the radial direction of the object to be mounted by engaging with the recessed portions formed on the object to be mounted. In the mount operation unit 205, operation knobs 206a and 206b are arranged on opposite lines across the optical axis. If the user holds the operation knobs 206a and 206b and performs a rotation operation of the mount operation unit 205, the mount catch 230 rotates in the radial direction.

The contact unit 300 is disposed below the opening of the mount section 200 and includes the first contact portions 301. The contact unit 300 is movable in the direction of the optical axis by the moving mechanical unit. In the state shown in FIG. 25, the first contact portions 301 are urged by a spring from the rear to the front so as to be in a state of protruding forward from the mount surface 210.

Figure 26:
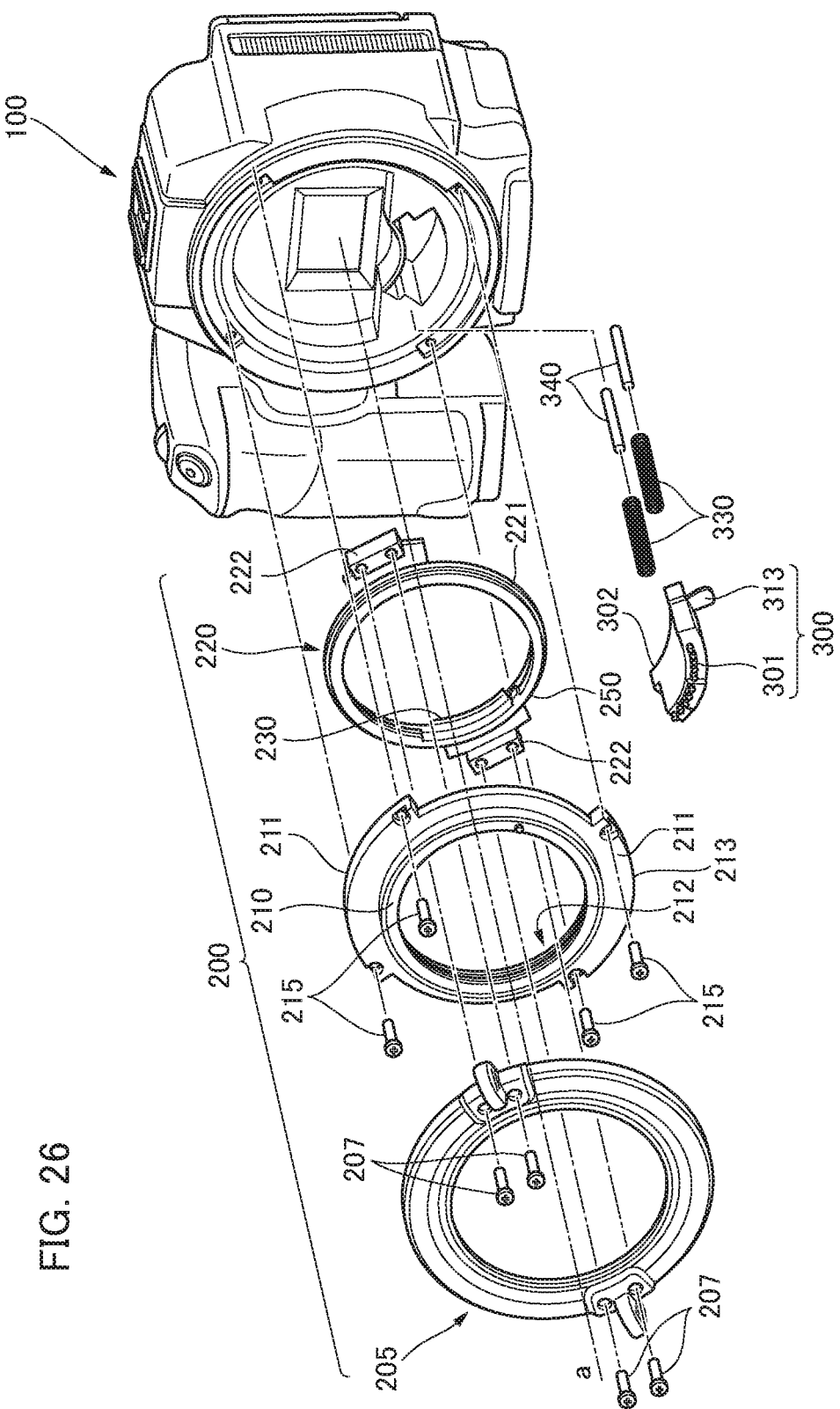
FIG. 26 is an exploded external perspective view of a portion related to a mount section of the imaging apparatus according to the second example.

The configuration of the mount section 200 and the contact unit 300 will be described with reference to FIG. 26. FIG. 26 is an exploded perspective view with regard to the mount section 200. A member 213 having the mount surface 210 is fastened and fixed to the imaging apparatus 100 with screws 215 at mounting portions 211 that extend vertically. The mount surface 210 is annularly formed, and internal threads 212 are formed on the inner peripheral surface of the opening portion. A substantially ring-shaped rotating member 220 is disposed behind the member 213 having the mount surface 210. The rotating member 220 includes a plurality of mount catches 230. External threads 221 are formed on the outer peripheral portion of the rotating member 220 and screwed with internal threads 212 formed on the inner peripheral surface of the opening portion of the mount surface 210. As a result, the rotating member 220 can move linearly along the direction of the optical axis with the rotation. In the present example, the rotating member 220 moves rearward by rotating the rotating member 220 in the counterclockwise direction as viewed from the front. Additionally, the rotating member 220 includes a plurality of mounting portions 222 extending in the outer peripheral direction. The mounting portions 222 are integrally fixed to the mount operation unit 205 with screws 207 sandwiching the outer peripheral portion of the member 213 having the mount surface 210. That is, if the mount operation unit 205 is rotated, for example, in the counterclockwise direction as viewed from the front, the mount catches 230 provided on the rotating member 220 move rearward while rotating in the counterclockwise direction.

The contact unit 300 having the first contact portions 301 is disposed at a lower position at the opening of the mount section 200. The contact unit 300 is movably supported in a state of being fitted into two shafts 340 fixed to the body. The shafts 340 extend along the direction of the optical axis, and the contact unit 300 can smoothly move along the shafts 340. Additionally, the contact unit 300 is urged by a plurality of coil springs 330 from behind. The coil spring 330 is an example of elastic members that urge the contact unit 300 toward the object in the direction of the optical axis. In the state of FIG. 26, the stopper 313 of the contact unit 300 remains stationary in a state in contact with the rear surface (back surface) of the member 213 having the mount surface 210. Since the contact unit 300 is urged by the coil springs 330, the first contact portions 301 protrude from the mount surface 210 in no-load state. If the contact unit 300 is pressed in from the front, the contact unit 300 moves rearward of the mount surface 210 in the direction of the optical axis. In a state in which the contact unit 300 is pressed in the most, the first contact portions 301 are in a position suitable for contact with the object to be mounted. In a state in which the object to be mounted is pressed against the mount surface 210, the first contact portions 301 securely contact the second contact portion, which is an object to be mounted. Additionally, if an unexpected external force is applied to the first contact portions 301 from the front, the contact unit 300 retracts rearward from the mount surface 210, so there is no fear of damage.

Figure 27:
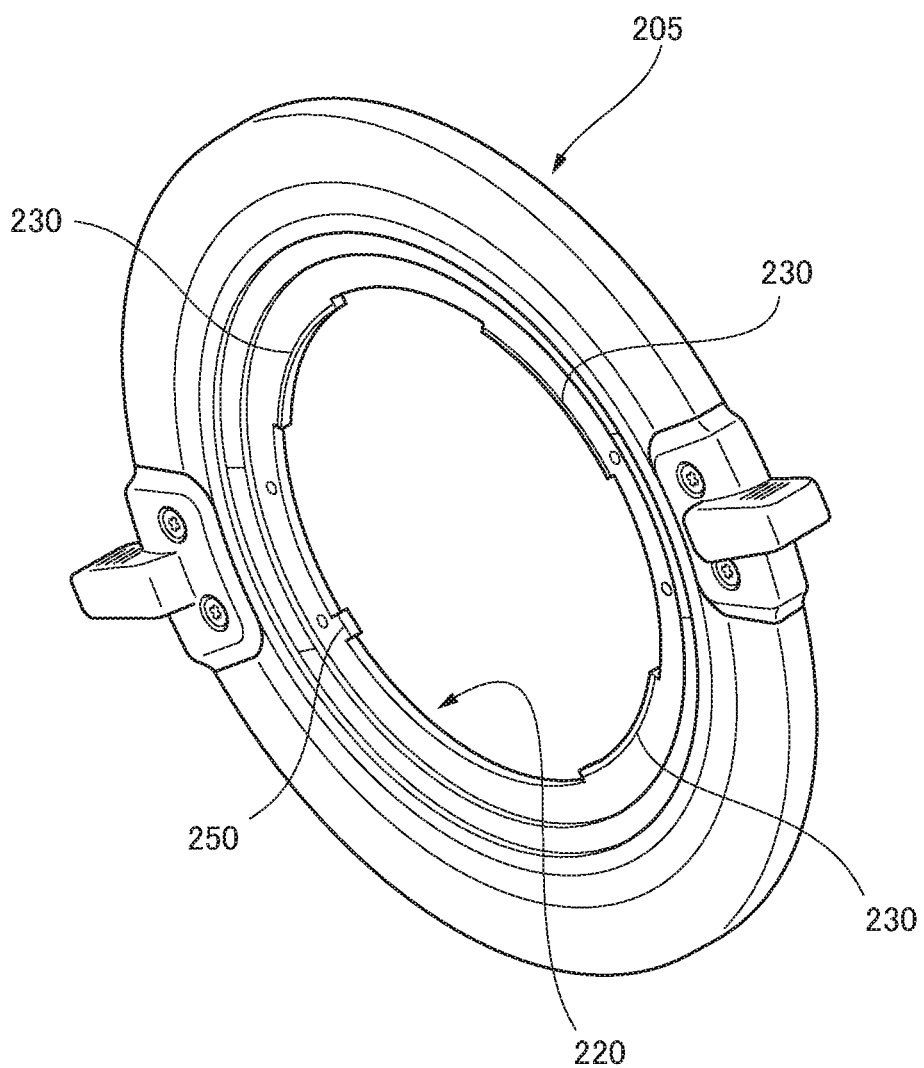
FIG. 27 is an external perspective view of a mount operation unit and a rotating member of the imaging apparatus according to the second example.

FIG. 27 is an external perspective view illustrating the mount operation unit 205 and the rotating member 220 that are integrated. Note that the member 213 having the mount surface 210 to be sandwiched between the mount operation unit 205 and the rotating member 220 is not illustrated. The rotating member 220 is formed integrally with the mount operation unit 205. The mount catches 230 formed on the inner side of the rotating member 220 perform a typical bayonet engagement, for example, with mount catches 820 (see FIG. 29B) formed on the first MA 800 to be described below. In the imaging apparatus 100, a contact terminal engagement portion 250 is provided in the vicinity of the contact unit 300 on the plane that is the same as that of the mount catches 820. Since the contact terminal engagement portion 250 is formed on the rotating member 220, it moves in conjunction with the operation of the mount operation unit 205.

Figure 28:
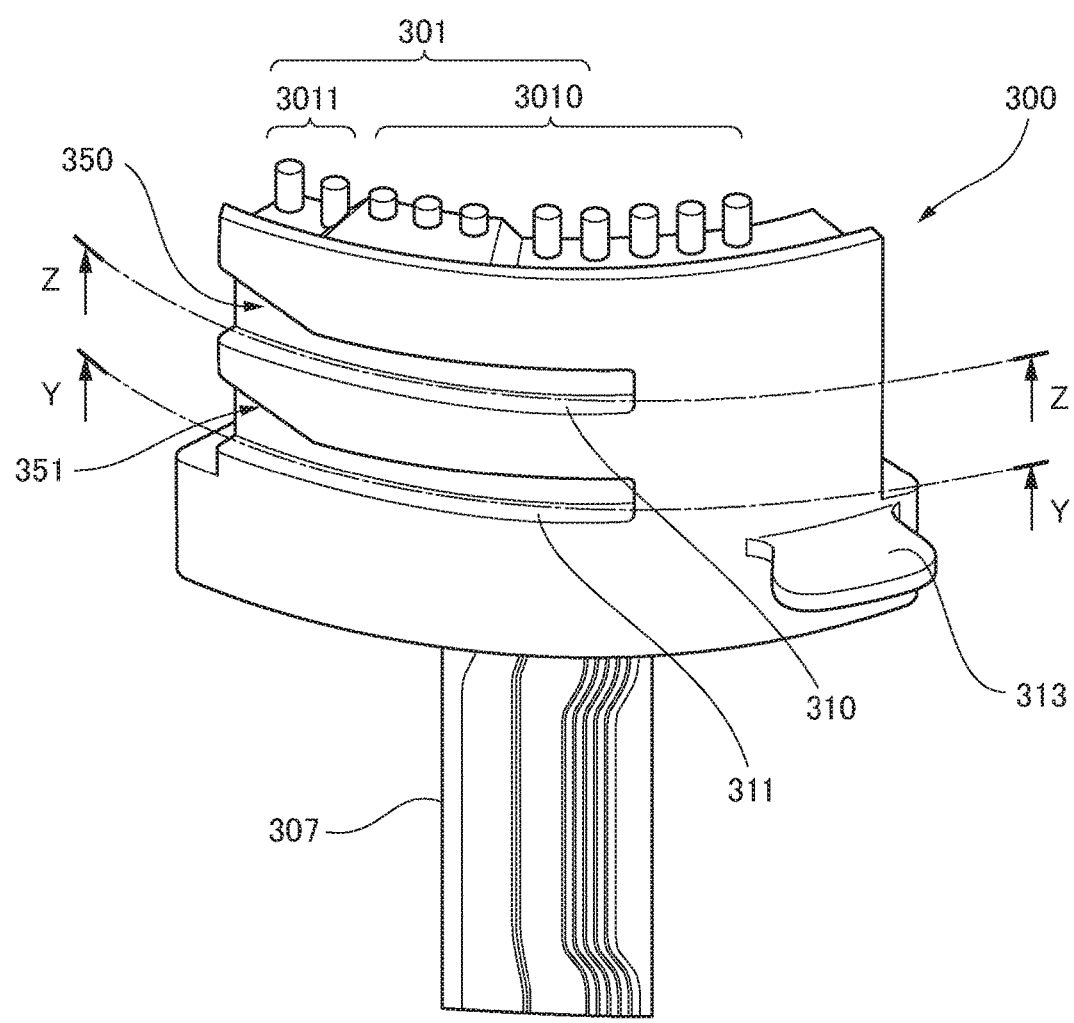
FIG. 28 is an external perspective view of a contact unit of the imaging apparatus according to the second example.

FIG. 28 is an external perspective view of the contact unit 300. The electric connection member 307 is connected to the contact unit 300. One end of the electrical connection member 307 is electrically connected to the first contact portions 301, and the other end is electrically connected to a substrate (not illustrated) inside the imaging apparatus 100. The first contact portions 301 include a lens contact terminal group 3010 and an adapter contact terminal group 3011. The lens contact terminal group 3010 is a contact group connected to the contact portion of the interchangeable lens. Additionally, the adapter contact terminal group 3011 is a contact group connected to the contact portion of the mount adapter. These contact groups are electrically connected to the electrical connecting member 307. If the interchangeable lens is mounted on the body of the imaging apparatus 100, the interchangeable lens and body are electrically connected via the lens contact terminal group 3010 so that a power supply from the imaging apparatus 100 to the interchangeable lens and a bidirectional communication are possible. Additionally, if the imaging apparatus 100 and a rear converter to be described below are electrically connected via the adapter contact terminal group 3011, a power supply from the imaging apparatus 100 to the rear converter and communication between the imaging apparatus 100 and the rear converter become possible. A front engagement groove 310 and a rear engagement groove 311 are formed on the side portion of the contact unit 300 having such a function. A slope portion 350 is formed at the entrance of the front engagement groove 310 and a slope portion 351 is formed at the entrance of the rear engagement groove 311.

Next, a structure of the mount adapter and the imaging apparatus 100 that fixes the mount adapter will be described. In the following description, a description will be given of the first MA 800 to be mounted on the body in a state in which the contact unit 300 is in the rear position and the second MA 900 to be mounted on the body in a state in which the contact unit 300 is in the front position.

Figure 29B:
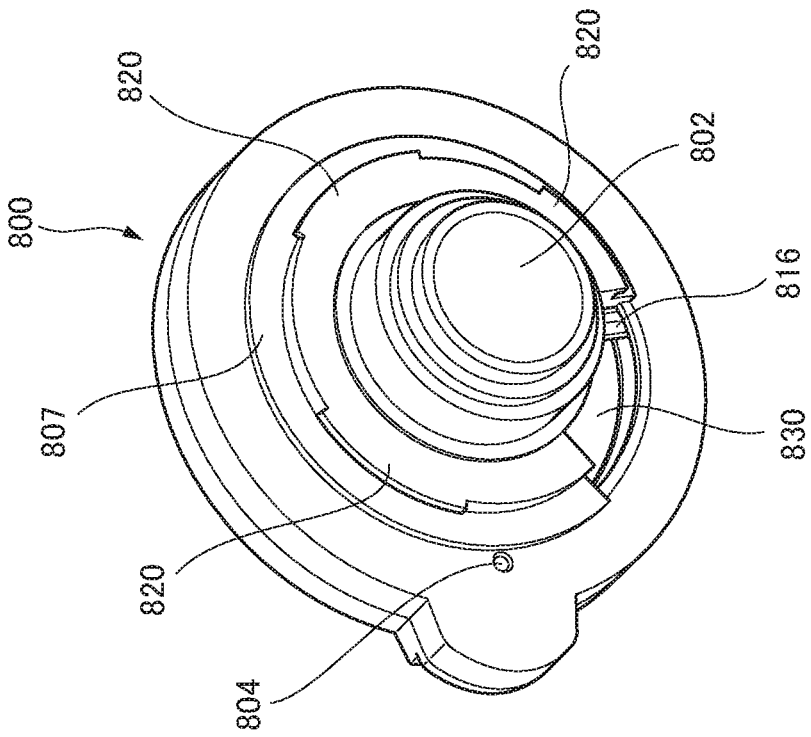
FIGS. 29A and 29B are external perspective views illustrating a first mount adapter according to the second example.
Figure 29A:
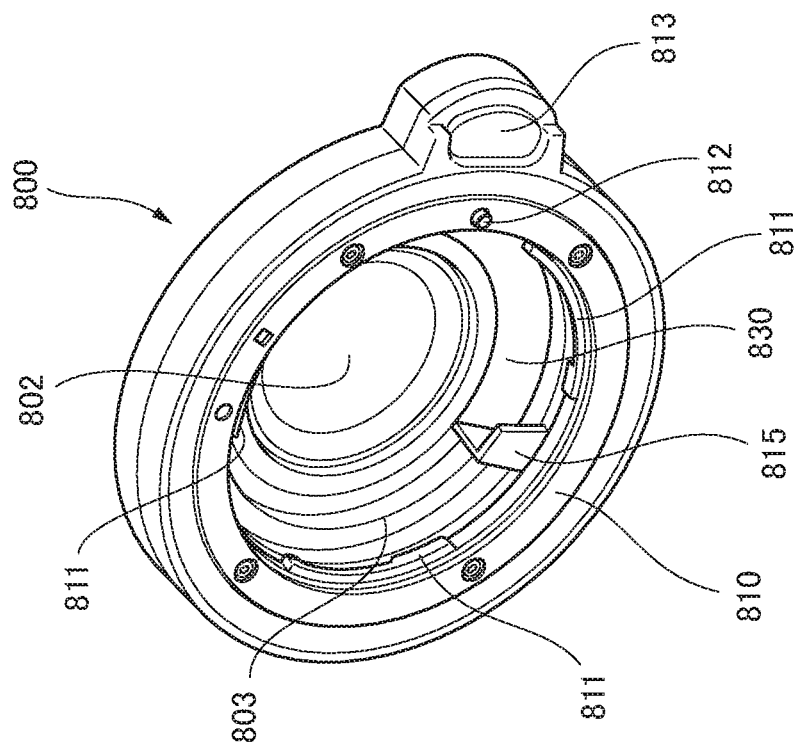

FIG. 29A is an external perspective view illustrating the first MA 800 from the front, and FIG. 29B is an external perspective view illustrating the first MA 800 from the back. At the front of the first MA 800, a lens mounting portion 810 for mounting the interchangeable lens is provided. The lens mounting portion 810 includes a plurality of lens mounting catches 811, and the lens mounting catches 811 respectively engage with the mount catches of the interchangeable lens. A lock pin 812 is a movable member for determining the mounting phase of the interchangeable lens mounted on the first MA 800. The protrusion amount of the lock pin 812 is adjusted by an operation of a lens release knob 813.

The first MA 800 internally includes the conversion lens 802. An effect of reducing the F value can be obtained by a light collecting action of the conversion lens 802 configuring the reduction optical system. Alternatively, due to the diffusion action of the conversion lens 802 configuring the enlargement optical system, an enlarged image whose focal length is extended can be obtained in the imaging element 101. The conversion lens 802 is configured by a plurality of lens groups and held by the adapter cylinder 803.

The conversion lens 802 includes an image blur correction lens (shift lens) that is swingable vertically and horizontally. The adapter cylinder 803 has a drive mechanical section of an image blur correction lens, and the image blur correction lens is driven in a direction to cancel image blur caused by hand shake of the user and the like. Since optical image blur correction is well known, a detailed description thereof will be omitted. It is possible to expand the application of the imaging apparatus 100 by providing the lens drive mechanical section inside the mount adapter. The autofocus of the interchangeable lens 700 can be assisted by, for example, a control that moves the movable lens in the direction of the optical axis.

An opening 830 passing through in the direction of the optical axis of the conversion lens 802 is formed on the lower side of the adapter cylinder 803. A flange 815 is provided at one end of the opening 830. An adapter contact 816 is exposed on the back face of the flange 815 and functions as an electrical contact for operating the drive mechanical section of the internal movable lens. That is, the adapter contact 816 is electrically connected to a control board in the body by coming into contact with the adapter contact terminal group 3011 configuring the first contact portions 301 of the body. Thereby, a drive control of the movable lens inside the first MA 800 is performed, and a correction control of the image blur due to camera shake and the like becomes possible. On the back face of the first MA 800, there are a plurality of mount catches 820 that engage with the mount catches 230 of the body, and the mount surface 807 that comes into contact with the mount surface 210 of the body at the time of mounting.

Figure 30A:
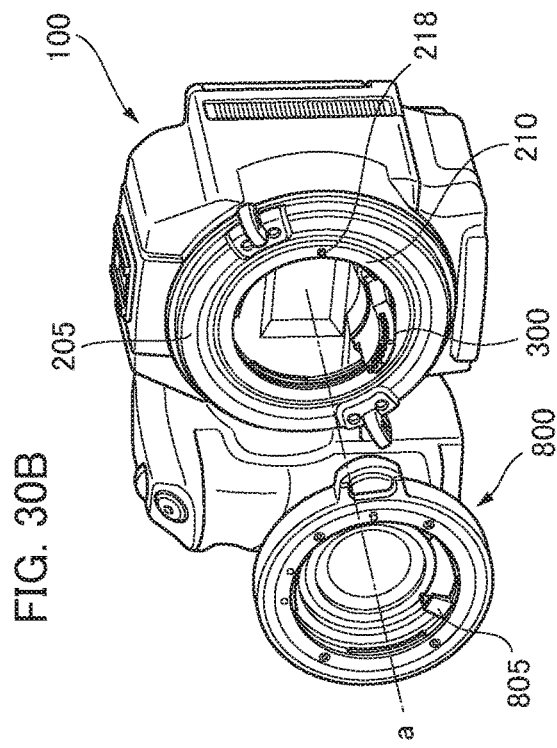
FIGS. 30A to 30D are perspective views illustrating an operation that mounts the first mount adapter on the imaging apparatus.

With reference to FIGS. 30A to 30D, the operation at the time of mounting the first MA 800 on the body of the imaging apparatus 100 will be described. FIG. 30A is a perspective view illustrating a state in which nothing is mounted on the body. In this state, the contact unit 300 remains stationary at the front position (second position), and if the contact unit 300 is pressed in from the front, the contact unit 300 retracts rearward.

Figure 30B:
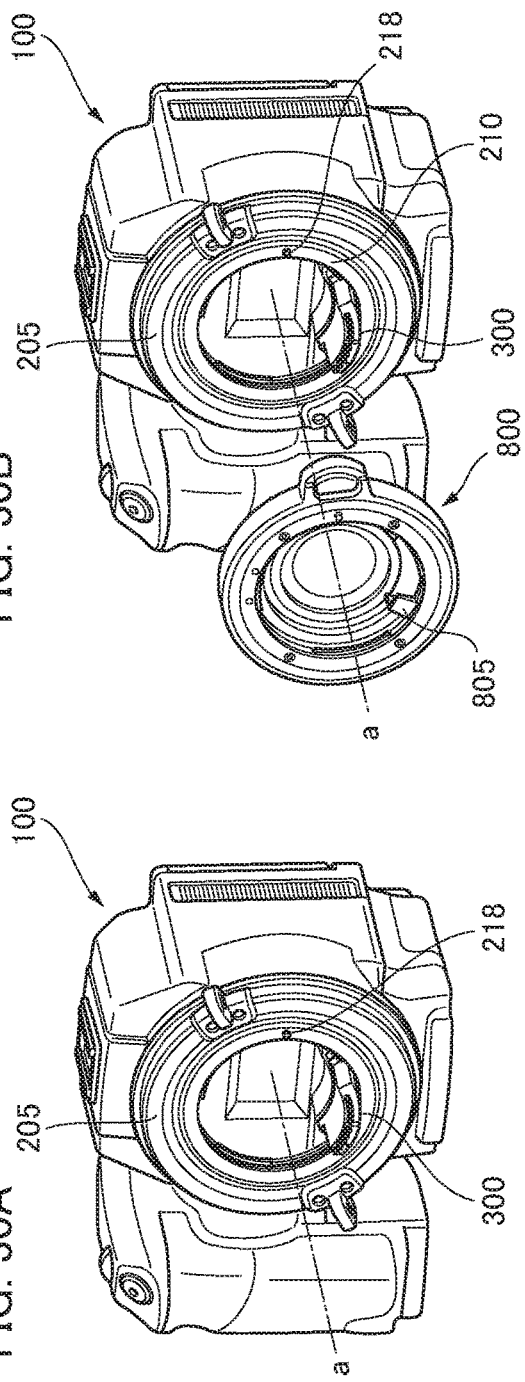
Figure 30C:
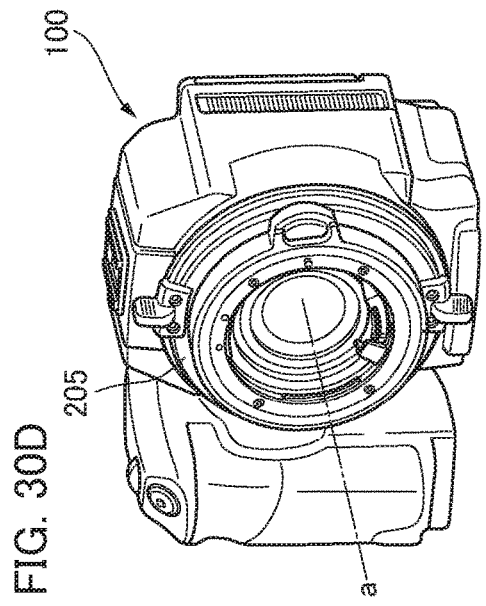

FIG. 30B is a perspective view illustrating a state immediately before mounting the first MA 800 on the body. The user brings the first MA 800 closer along the direction of the optical axis straight to the body and brings the mount surface 210 of the body and the mount surface 807 of the first MA 800 into contact with each other. In this state, the mount catches 230 of the body and the mount catches 820 of the first MA 800 are set so as to have a complementary positional relation. Accordingly, if the rear end of the first MA 800 is inserted into the opening of the mount section 200, the mount catches 820 of the first MA 800 pass between the mount catches 230 of the body and enter to the back of the mount surface 210. At this time, the adapter contact 816 of the flange 815 of the first MA 800 comes into contact with the adapter contact terminal group 3011 of the contact unit 300, and the contact unit 300 is pushed rearward to retract to the rear position (first position). This state is shown in FIG. 30C. The first MA 800 is pressed against the body.

In the present example, the adapter contact 816 is provided in the first MA 800. However, if the conversion lens 802 includes a fixed lens group, the adapter contact 816 on the back face of the flange 815 is unnecessary. In this case, an operation that directly presses the contact unit 300 by the flange 815 is performed.

Figure 30D:
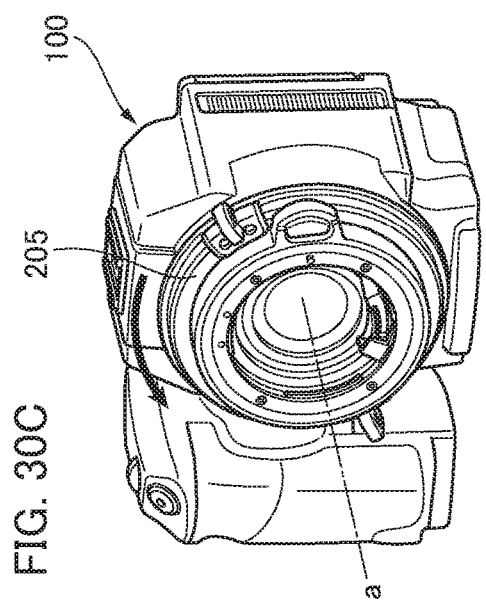

Next, the user performs an operation of rotating the mount operation unit 205 in the counterclockwise direction as viewed from the front (see the arrow in FIG. 30C). If the mount operation unit 205 rotates in the counterclockwise direction, the mount catches 820 of the first MA 800 enter the rear side of the mount catches 230 of the body, so that the forward movement of the first MA 800 is regulated. This state is illustrated in FIG. 30D. FIG. 30D is a perspective view illustrating a state in which the mounting of the first MA 800 on the body of the imaging apparatus 100 has completed. The lock pin 218 of the body is fitted into the mount lock groove 804 (FIG. 29B) formed on the back face of the first MA 800, and the rotation of the first MA 800 is regulated. Moreover, the mount operation unit 205 slightly moves rearward in the direction of the optical axis in accordance with the rotation. Accordingly, the mount catches 230 of the rotating member 220 also slightly move rearward in the direction of the optical axis with the engagement operation due to the rotation. This operation becomes an operation of drawing the front surface of the mount catches 820 of the first MA 800 rearward, the mount surface 807 is drawn in the direction of the optical axis with the rotation of the mount operation unit 205, and finally, the two mount surfaces come into close contact with each other.

Although the contact unit 300 itself is urged forward by the coil spring 330, each of the first contact portions 301 arranged in the contact unit 300 is urged by a spring (not illustrated) from behind. That is, in order to ensure conduction between the first contact portions 301 and the adapter contact 816, the first contact portions 301 need to be pressed strongly toward the adapter contact 816. In order to securely perform conduction between the contacts, it is necessary to sufficiently reduce the urging force of each of the first contact portions 301, as compared with the urging force of the contact unit 300. In that case, it is necessary to further increase the urging force of the contact unit 300 by the coil spring 330 in order to reduce the contact resistance between the first contact portions 301 and the adapter contact 816 and to increase the urging force of the first contact portions 301. However, this may cause the size of the device to increase, so that the operability at the time for the mounting of the first MA 800 or the like may remarkably be lowered.

Figure 31B:
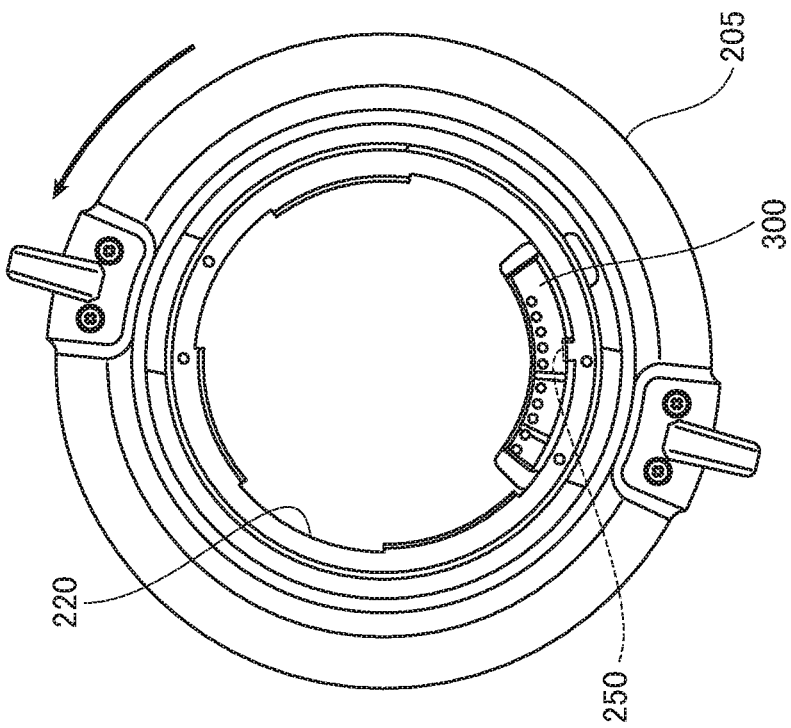
FIGS. 31A and 31B are each front views of the principal part illustrating a positional relation between the mount operation unit and the contact unit of the imaging apparatus according to the second example.
Figure 31A:
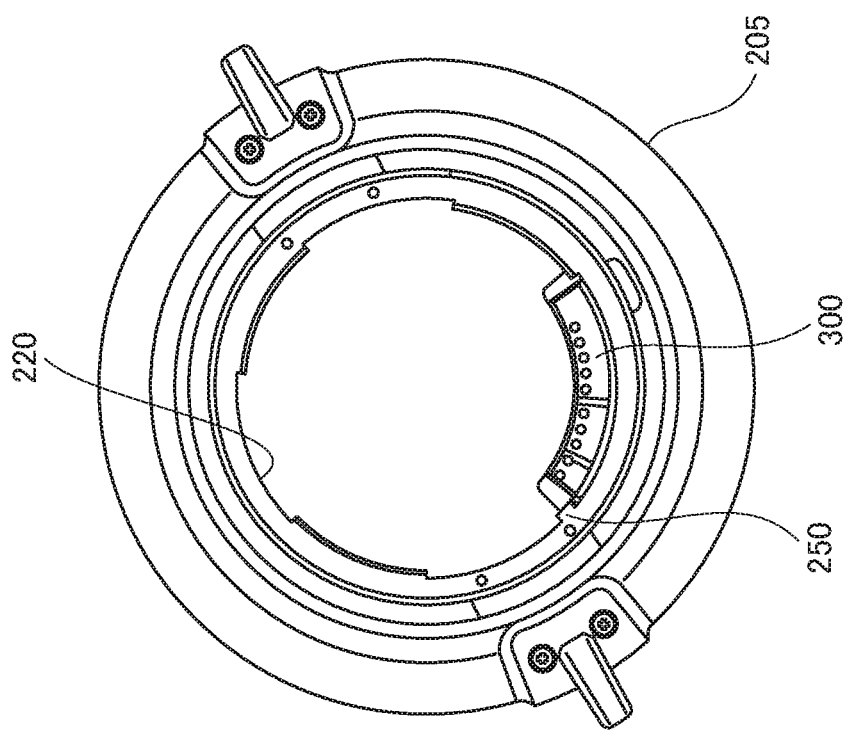

Accordingly, in the present example, if the mounting operation by the mount operation unit 205 is performed, the contact terminal engagement portion 250 shown in FIG. 27 is inserted into the front engagement groove 310 of the contact unit 300 shown in FIG. 28. Since the contact unit 300 is slightly pushed forward, a sufficient contact resistance between the adapter contact terminal group 3011 and the adapter contact 816 is secured. With reference to FIGS. 31A and 31B, a pushing mechanism by the front engagement groove 310 of the contact unit 300 will be described.

FIGS. 31A and 31B are front views of the principal part showing the positional relation between the mount operation unit 205 and the contact unit 300. FIG. 31A illustrates a state in which the first MA 800 is pressed to the body, and FIG. 31B illustrates a state in which the first MA 800 is mounted on the body. The contact terminal engagement portion 250 is separated from the contact unit 300 in a state before the first MA 800 is mounted. If the user rotates the mount operation unit 205 by about 45 degrees in the counterclockwise direction as viewed from the front, the contact terminal engagement portion 250 overlaps the contact unit 300 in a projected state and is invisible. At this time, the contact terminal engagement portion 250 is inserted into the front engagement groove 310 or the rear engagement groove 311 shown in FIG. 28. Here, which of the front engagement groove 310 and the rear engagement groove 311 engages with the contact terminal engagement portion 250 depends on the type of the mount adapter to be mounted. Specifically, the engagement groove is selected in accordance with the pushing amount of the first contact portions 301 depending on the type of the mount adapter.

FIGS. 32A to 32D illustrate the positional relation between the front engagement groove 310 of the contact unit 300 and the contact terminal engagement portion 250 of the rotating member 220. FIGS. 32A to 32C are front views. FIG. 32A illustrates a state before the operation of the mount operation unit 205. FIG. 32B illustrates a state in which the mount operation unit 205 is rotated by about 8 degrees in the counterclockwise direction as viewed from the front. FIG. 32C illustrates a state in which the mount operation unit 205 is rotated by about 45 degrees in the counterclockwise direction as viewed from the front, which is the mounting state of the first MA 800.

FIG. 32D is a cross-sectional view of the principal part each corresponding to FIGS. 32A to 32C and illustrates the positional relation between the contact unit 300 and the contact terminal engagement portion 250 as viewed from the Q direction in FIGS. 32A to 32C. The contact unit 300 is shown as a cross section taken along the cross-section indicating line Z-Z shown in FIG. 28. FIG. 32D illustrates, from left to right, how the front engagement groove 310 of the contact unit 300 engages with the contact terminal engagement portion 250 of the rotating member 220. Specifically, the left of FIG. 32D is a state before the contact terminal engagement portion 250 engages with the front engagement groove 310. The middle of FIG. 32D is a state in which the contact terminal engagement portion 250 is in contact with the slope portion 350. The right of FIG. 32D is a state in which the engagement between the contact terminal engagement portion 250 and the front engagement groove 310 is completed.

As shown by a dashed line in FIG. 32D, the contact terminal engagement portion 250 moves slightly rearward with the rotation operation of the mount operation unit 205. The amount of rearward movement of the contact terminal engagement portion 250 is determined by the condition of the external threads 221 of the rotating member 220. Additionally, the slope portion 350 and the slope portion 351 are respectively provided at the front ends (the ends on the entrance side) of the front engagement groove 310 and the rear engagement groove 311. The slope portions are designed so that the width in the direction of the optical axis is equal to or greater than the amount of rearward movement of the contact terminal engagement portion 250 described above. Accordingly, if the mount operation unit 205 is rotated in the counterclockwise direction, the contact unit 300 is pushed forward in the direction of the optical axis by the contact terminal engagement portion 250 (see dimension D in FIG. 32D). Therefore, in the contact unit 300, sufficient contact resistance between the first contact portions 301 and the adapter contact 816 is ensured, regardless of the urging force of the coil spring 330.

Figure 33B:
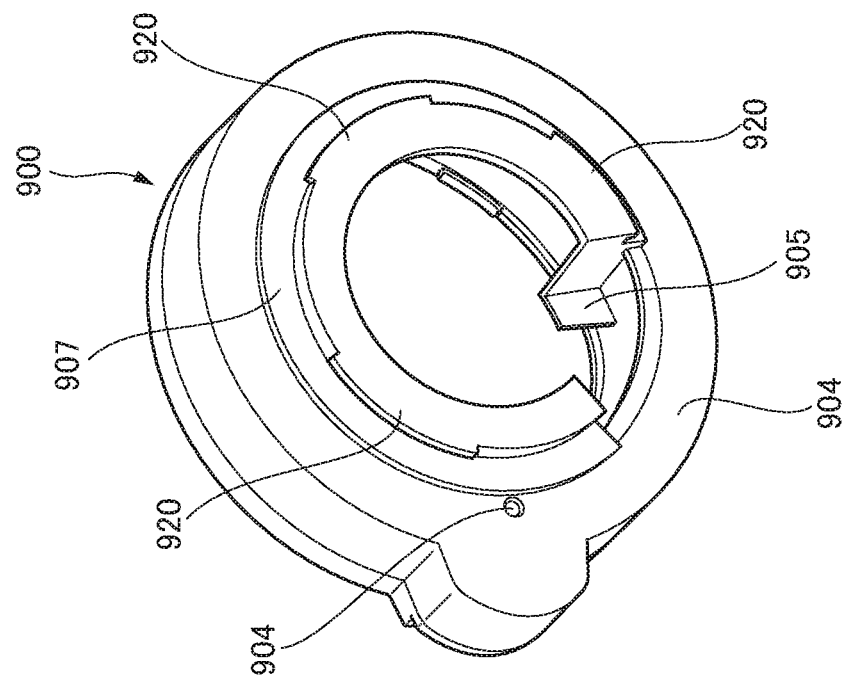
FIGS. 33A and 33B are external perspective views illustrating the second mount adapter according to the second example.
Figure 33A:
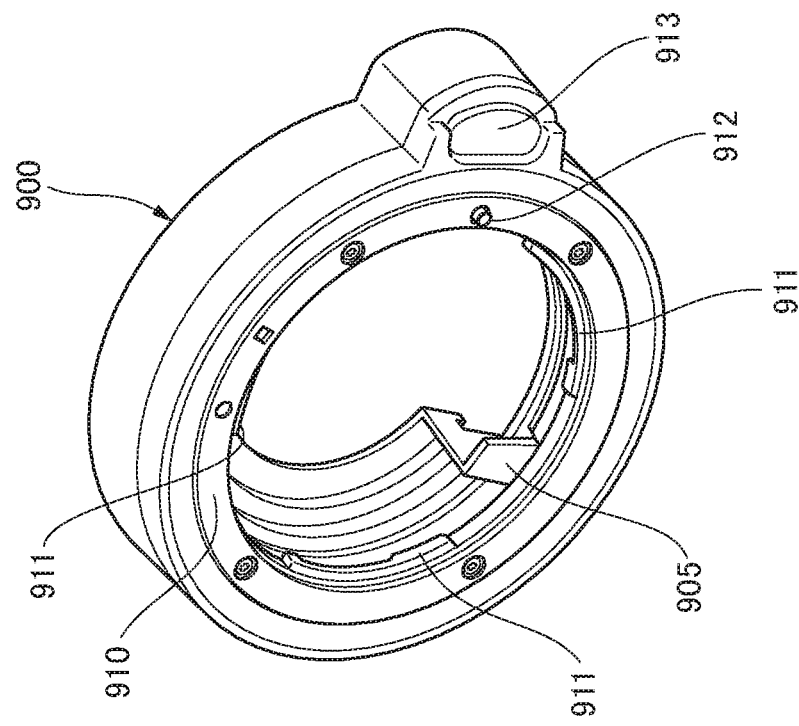

The second MA 900 will be described with reference to FIGS. 33A and 33B. FIG. 33A is an external perspective view illustrating the second MA 900 as viewed from the front. FIG. 33B is an external perspective view illustrating the second MA 900 as viewed from the back. In a manner similar to the first MA 800, the second MA 900 includes a lens mounting portion 910, lens mounting catches 911, a lock pin 912, a lens release knob 913, a flange 905, the mount lock groove 904, the mount surface 907, and mount catches 920. Differences from the first MA 800 are as follows.

- The interior of the second MA 900 is a hollow cylindrical adapter (no lens).
- The width (thickness) of the second MA 900 in the direction of the optical axis is greater than that of the first MA 800.
- The second MA 900 has no electrical connecting portion to the imaging apparatus 100 and the interchangeable lens 700.

The second MA 900 has no electrical connecting portion, and no member similar to the adapter contact 816 of the first MA 800 is provided on the back face of the flange 905.

Figure 34:
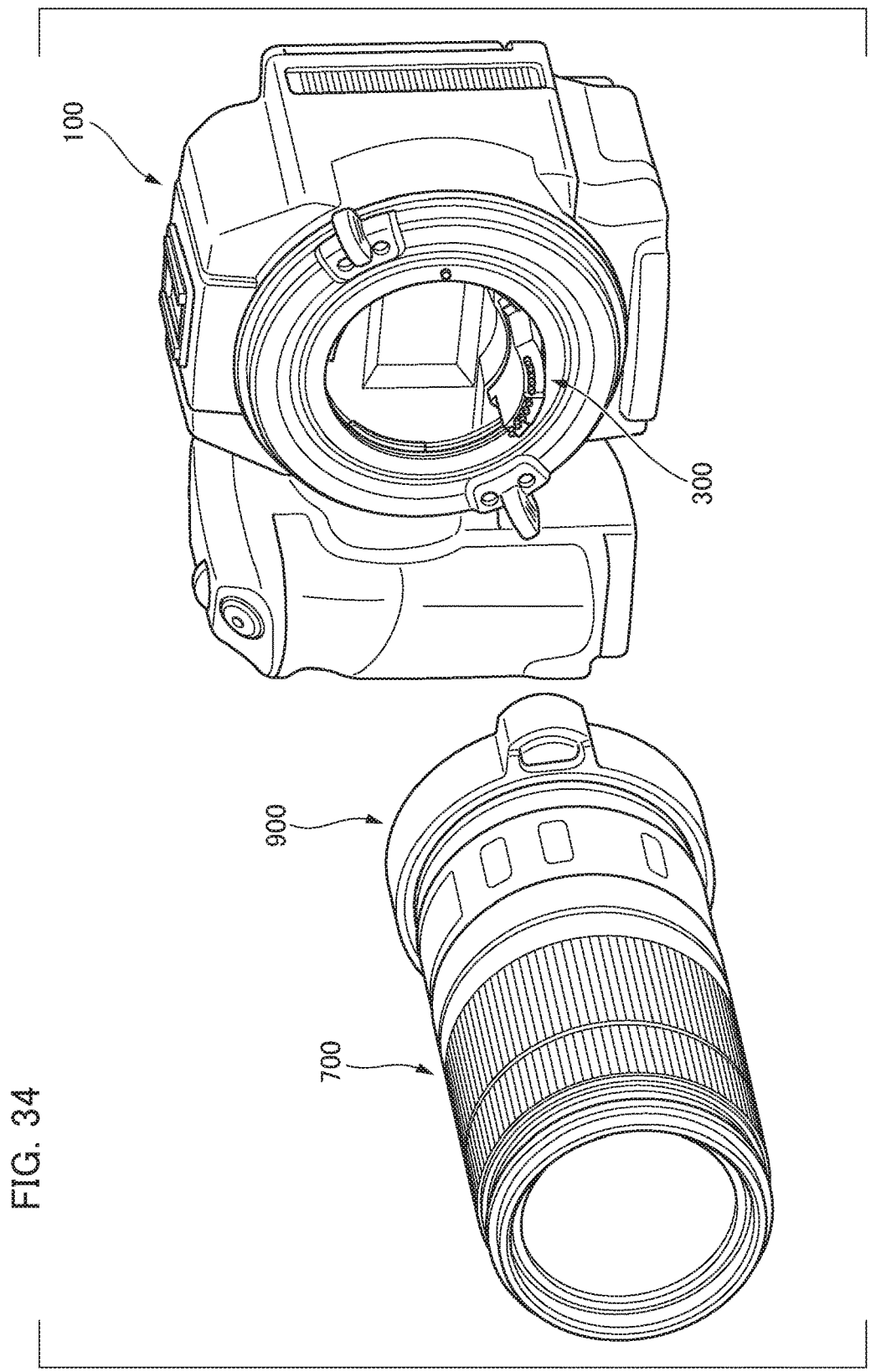
FIG. 34 is an external perspective view illustrating a state at the time of mounting the interchangeable lens and the second mount adapter on the imaging apparatus according to the second example.

FIG. 34 is an external perspective view illustrating the interchangeable lens 700, the second MA 900, and the body of the imaging apparatus 100. FIG. 34 illustrates a state in which the user mounts the interchangeable lens 700 on the second MA 900 in advance and then mounts it on the body. The second MA 900 has no contact portions unlike the first MA 800. However, at the time of mounting the second MA 900 on the body, the first contact portions 301 is pushed into by the second contact portions 701a of the interchangeable lens 700. In a manner similar to the first MA 800, in order to ensure conduction between the first contact portions 301 and the second contact portions 701a, the first contact portions 301 need to be pressed strongly against the second contact portions 701a. If the interchangeable lens 700 and the second MA 900 approach the body of the imaging apparatus 100 from the state shown in FIG. 34, the second MA 900 comes into close contact with the body. In this state, the second contact portions 701a of the interchangeable lens 700 contact the lens contact terminal group 3010, the contact unit 300 is rearward pushed into and retracts to the first position located rearward.

Figures 35A, 35B, 35C:
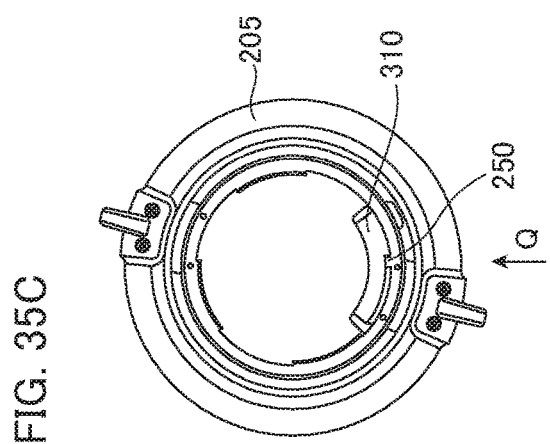
FIGS. 35A to 35D illustrate positional relations between the rear engagement groove and the contact terminal engagement portion of the imaging apparatus according to the second example.

FIGS. 35A to 35D illustrate the positional relation between the rear engagement groove 311 and the contact terminal engagement portion 250 in a state in which the contact unit 300 is in the third position. FIG. 35A illustrates a state before the operation of the mount operation unit 205. FIG. 35B illustrates a state in which the mount operation unit 205 is rotated by about 8 degrees in the counterclockwise direction as viewed from the front. FIG. 35C illustrates a state in which the mount operation unit 205 is rotated by about 45 degrees in the counterclockwise direction as viewed from the front, which is the mounting state of the second MA 900.

Figure 35D:
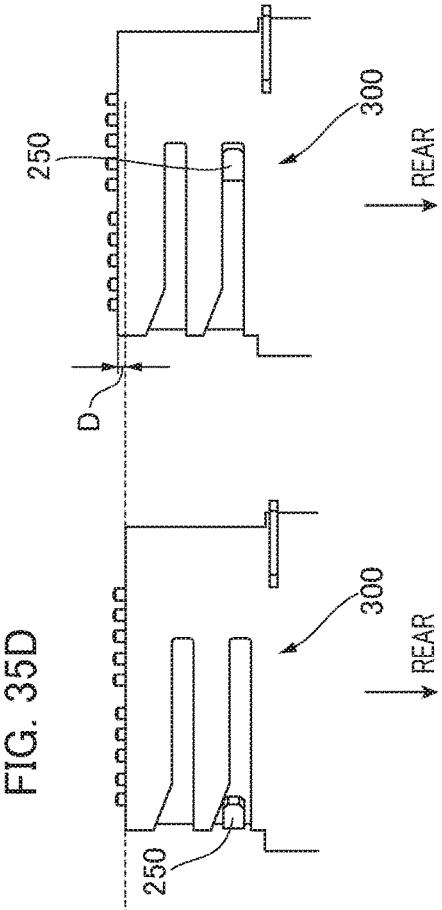

FIG. 35D is a cross-sectional view of a principal part corresponding to each of FIGS. 35A to 35C, illustrating the positional relation between the contact unit 300 and the contact terminal engagement portion 250 as viewed from the Q direction in FIGS. 35A to 35C. The contact unit 300 is shown as a cross-section taken along the cross-section indicating line Y-Y shown in FIG. 28. From the left to the right of FIG. 35D, a state is shown in which the rear side engagement groove 311 of the contact unit 300 engages with the contact terminal engagement portion 250 of the rotating member 220. Specifically, the left in FIG. 35D is a state before the contact terminal engagement portion 250 engages with the rear engagement groove 311. The middle in FIG. 35D is in a state in which the contact terminal engagement portion 250 is in contact with the slope portion 351. The right of FIG. 35D is in a state in which the engagement between the contact terminal engagement portion 250 and the rear engagement groove 311 has completed.

If the second MA 900 is mounted on the body, the contact terminal engagement portion 250 moves slightly rearward with the rotation operation of the mount operation unit 205 in a manner similar to the first MA 800. When the second MA 900 is mounted, since the second MA 900 is thicker than the first MA 800, the moving amount of the contact unit 300 in the direction of the optical axis is small. Accordingly, the contact terminal engagement portion 250 engages with the rear engagement groove 311 formed on the rear side of the contact unit 300. The distance in the direction of the optical axis between the front engagement groove 310 and the rear engagement groove 311 provided in the contact unit 300 is the same as the difference in thicknesses between the second MA 900 and the first MA 800.

As shown in FIG. 35D, when the second MA 900 is mounted on the body, the rear engagement groove 311 formed on the rear of the contact unit 300 engages with the contact terminal engagement portion 250. As a result, in a manner similar to the first MA 800, the contact unit 300 is pushed forward in the direction of the optical axis by the contact terminal engagement portion 250 (see dimension D in FIG. 35D). Therefore, sufficient contact resistance is secured between the first contact portions 301 and the adapter contact 816.

Figure 36B:
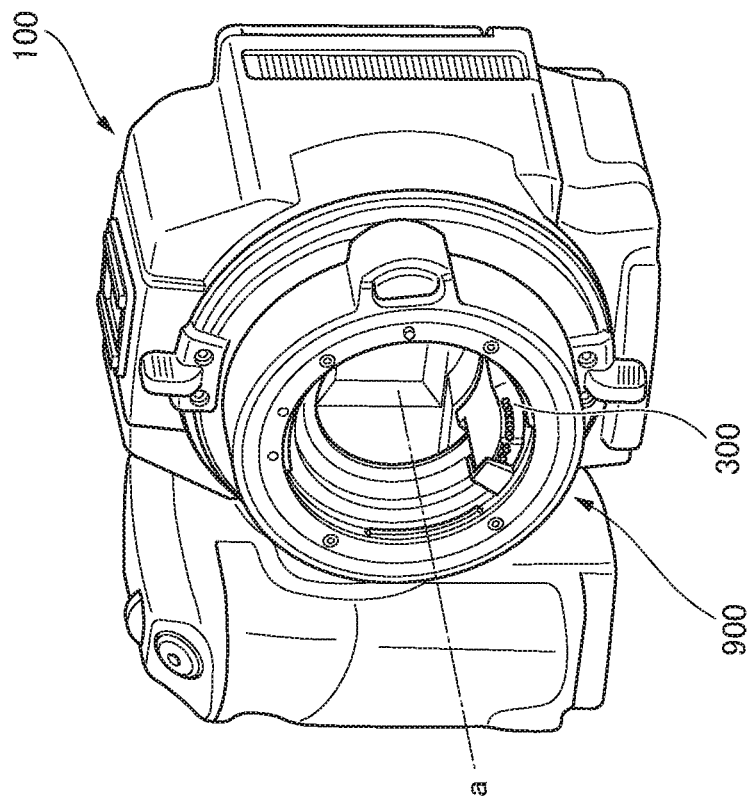
FIGS. 36A and 36B are perspective views illustrating a state in which the mount adapter according to the second example is mounted on the body.
Figure 36A:
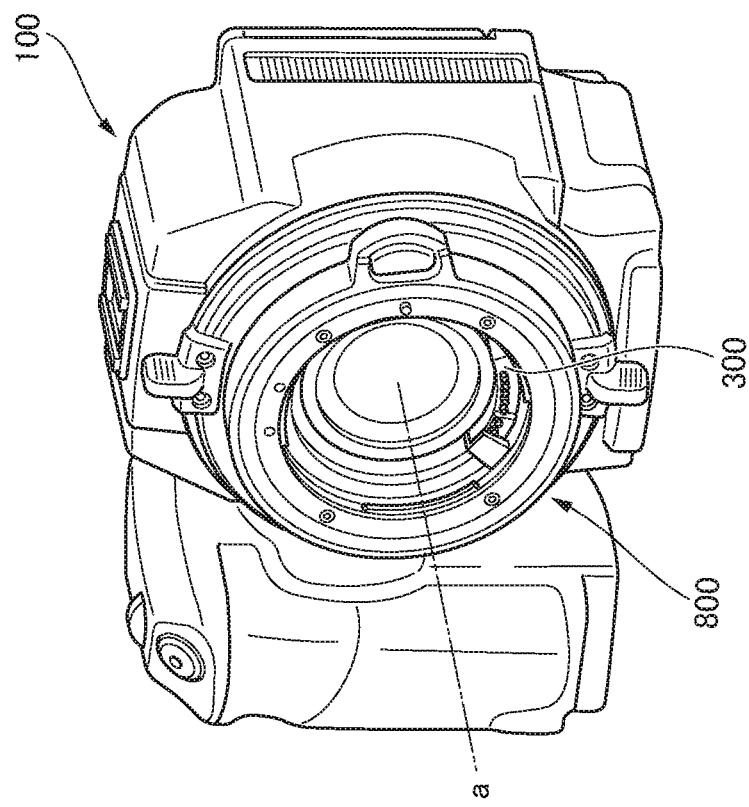

FIGS. 36A and 36B are external perspective views illustrating a state in which two types of mount adapters having different thicknesses in the direction of the optical axis are respectively mounted on the body. FIG. 36A illustrates a mounting state of the first MA 800 that is relatively thin, and FIG. 36B illustrates a mounting state of the second MA 900 that is relatively thick.

In the present example, it is possible to mount a plurality of mount adapters having different thicknesses on the body by providing the moving mechanical unit that allows the contact unit 300 to move in the direction of the optical axis. In the state shown in FIG. 36A, in which the first MA 800 is mounted on the body, in comparison with the state shown in FIG. 36B, in which the second MA 900 is mounted on the body, the contact unit 300 is pushed rearward into in the direction of the optical axis. Specifically, the imaging apparatus 100 is compatible with a plurality of mount adapters having different thicknesses by the contact unit 300 taking a plurality of positions on the optical axis.

Modification

Figure 37:
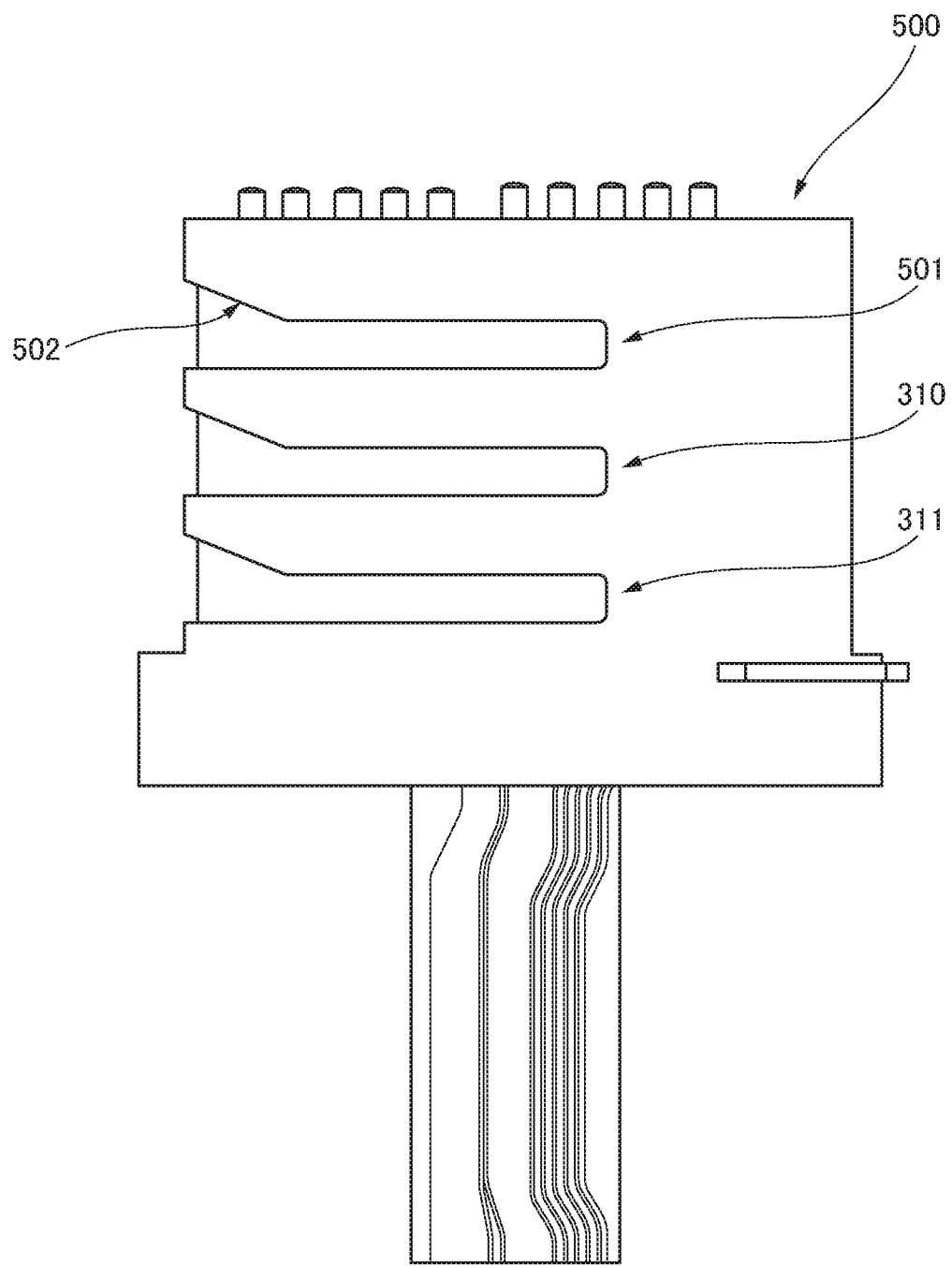
FIG. 37 illustrates a contact terminal portion according to a modified example of the second example.

Next, a modification of the second example will be described with reference to FIG. 37. The contact unit 300 according to the modification includes a third engagement groove 501 in addition to the front engagement groove 310 and the rear engagement groove 311. For example, the third engagement groove 501 is formed in front of the front engagement groove 310 and the rear engagement groove 311. In a contact terminal portion 500 having three engagement grooves, the third engagement groove 501 having a slope surface portion 502 engages with the contact terminal engagement portion 250. Accordingly, compatibility with the third mount adapter that is further thinner than the first MA 800 is possible.

Alternatively, in another modification, the position of the third engagement groove 501 is set to correspond to the interchangeable lens rather than the mount adapter. That is, if the interchangeable lens 700 is mounted on the body of the imaging apparatus 100, the third engagement groove 501 is used. In the contact unit of the modification, a plurality of engagement grooves corresponding to a difference in flange focal length between a plurality of interchangeable lenses or mount adapters is arranged so as to be separated in the direction of the optical axis. According to this configuration, it is possible to provide an imaging apparatus and a mount adapter that are electrically connectable to an interchangeable lens, in a plurality of usage forms in which the positions of the electric contacts of the interchangeable lens or the mount adapter change with respect to the mount surface of the imaging apparatus.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-204445, filed Oct. 18 2016, which is hereby incorporated by reference wherein in its entirety.

What is claimed is:

1. An imaging apparatus provided with a mount section on which a lens device and a mount adapter are mountable comprising:
a contact unit configured to have a camera side contact portion electrically connected to an accessory side contact portion provided in the lens device or the mount adapter; and
a moving mechanical unit configured to support the contact unit movably in the direction of an optical axis corresponding to the mount section,
wherein the contact unit is movable to a first position in a direction parallel to the direction of the optical axis and a second position that is different from the first position by the moving mechanical unit, in accordance with a type of the lens device or the mount adapter to be mounted on the mount section.

2. The imaging apparatus according to claim 1,
wherein the first position is a position that contacts the accessory side contact portion of the lens device to be mounted via a first mount adapter, and
wherein the second position is a position that contacts the accessory side contact portion of the lens device to be mounted via a second mount adapter.

3. The imaging apparatus according to claim 1,
wherein the first position is a position that contacts the accessory side contact portion of the lens device to be mounted via the mount adapter, and
wherein the second position is a position that contacts the accessory side contact portion of the lens device to be mounted on the mount section not via the mount adapter.

4. The imaging apparatus according to claim 1,
wherein the first position is a position that contacts the accessory side contact portion of a first lens device to be mounted on the mount section, and
wherein the second position is a position that contacts the accessory side contact portion of a second lens device to be mounted on the mount section.

5. The imaging apparatus according to claim 1,
wherein the camera side contact portion of the contact unit is movable to three or more positions that contact each of the accessory side contact portions of different types of the lens devices by the moving mechanical unit in a direction parallel to the optical axis.

6. The imaging apparatus according to claim 1,
wherein the first position is a first end position in a moving range of the contact unit and the second position is a second end position in the moving range.

7. The imaging apparatus according to claim 1,
wherein the moving mechanical unit includes a guide rail that engages with the contact unit to regulate a movement of the contact unit in a direction different from the direction of the optical axis.

8. The imaging apparatus according to claim 1,
wherein the moving mechanical unit includes an elastic support that applies an urging force attracting to the first position or the second position if the contact unit is displaced from the first or second position.

9. The imaging apparatus according to claim 1,
wherein the contact unit includes a position operation unit exposed to the outside through an operation opening portion of the imaging apparatus,
wherein the contact unit includes a protrusion protruding in the direction of the optical axis, and
wherein the protrusion engages with a portion to be engaged provided in a body of the imaging apparatus and shields the operation opening portion over the moving range of the contact unit.

10. The imaging apparatus according to claim 1,
wherein the contact unit includes a first lock pin that is movable in the direction of the optical axis and a biasing unit that biases the first lock pin in a first direction, and
wherein the first lock pin is fitted into a mount lock groove provided in the lens device or the mount adapter.

11. The imaging apparatus according to claim 10,
wherein a protrusion amount of the first lock pin is smaller than a distance by which the contact unit moves in the direction of the optical axis, and if the first lock pin comes into contact with the lens device or the mount adapter mounted on the mount section, the first lock pin retracts to a position where the protrusion amount becomes zero.

12. The imaging apparatus according to claim 10,
wherein the contact unit includes a second lock pin that is movable in the direction of the optical axis and an urging unit that urges the second lock pin in a second direction opposite to the first direction, and
wherein the second lock pin is fitted into a mount lock groove formed on a lens device or a mount adapter that is different from the lens device or the mount adapter in which the first lock pin is fitted into the mount lock groove.

13. The imaging apparatus according to claim 12,
wherein a protrusion amount of the second lock pin is smaller than a distance by which the contact unit moves in the direction of the optical axis and if the second lock pin comes into contact with the lens device or the mount adapter mounted on the mount section, the second lock pin retracts to a position where the protrusion amount becomes zero.

14. The imaging apparatus according to claim 1 further comprising:
an elastic member configured to urge the contact unit toward an object in the direction of the optical axis,
wherein the contact unit protrudes toward the object in the direction of the optical axis in a state in which the lens device or the mount adapter is not mounted on the mount section, and if the lens device or the mount adapter is mounted on the mount section, the contact unit moves in a direction opposite to the object.

15. The imaging apparatus according to claim 1 further comprising:
a rotating member configured to have a plurality of mount catches and be supported by a member having a mount surface in a rotatable state in the optical-axis rotational direction;
a mount operation portion configured to move the rotating member in the direction of the optical axis while rotating the rotating member, and
wherein the rotating member has an engagement portion, and the engagement portion engages with the contact unit to regulate a movement of the contact unit in the direction of the optical axis.

16. The imaging apparatus according to claim 15,
wherein if the lens device and the mount adapter are mounted on the mount section, the engagement portion engages with an engagement groove formed on the contact unit.

17. The imaging apparatus according to claim 16,
wherein the engagement groove is formed with a slope portion at an entrance into which the engagement portion is inserted, and the engagement portion and the slope portion come into contact with each other due to the rotation of the mount operation portion, and the contact unit moves toward an object in the direction of the optical axis, and
wherein the contact unit has the engagement grooves respectively corresponding to the lens devices or the mount adapters, and the engagement grooves are arranged so as to be separated along the direction of the optical axis.

18. A mount adapter that is mountable on a mount section of an imaging apparatus,
the imaging apparatus comprising:
a mount section on which a lens device and a mount adapter are mountable;
a contact unit configured to have a camera side contact portion electrically connected to an accessory side contact portion provided in the lens device or the mount adapter; and
a moving mechanical unit configured to support the contact unit movably in the direction of an optical axis corresponding to the mount section,
wherein the contact unit is movable to a first position in a direction parallel to the direction of the optical axis, and a second position that is different from the first position by the moving mechanical unit, in accordance with a type of the lens device or the mount adapter to be mounted on the mount section.

19. A mount adapter that is mountable on a mount section of an imaging apparatus,
the imaging apparatus comprising:
a mount section to which a lens device and a mount adapter are mountable;
a contact unit configured to have a camera side contact portion electrically connected to an accessory side contact portion of the lens device; and
a moving mechanical unit configured to support the contact unit movably in the direction of an optical axis of an imaging optical system,
wherein the contact unit includes a first lock pin that is movable in the direction of the optical axis and a biasing unit that biases the lock pin in a first direction,
wherein the camera side contact portion of the contact unit is movable to a first position that contacts the accessory side contact portion of the lens device to be mounted via a first mount adapter or is movable to a second position that contacts the accessory side contact portion of the lens device to be mounted via a second mount adapter,
wherein the first lock pin is fitted into a mount lock groove formed on the lens device or the mount adapter,
the mount adapter comprising:
the mount lock groove fitted onto the first lock pin.

20. The mount adapter according to claim 19,
wherein the width of the mount lock groove is equal to the width of the first lock pin in a direction orthogonal to the optical-axis rotational direction or the difference between the width of the mount lock groove and the width of the first lock pin is within a predetermined range.

21. The mount adapter according to claim 19 further comprising:
a guide slope portion configured to come into contact with the first lock pin,
wherein a state in which the first lock pin is in contact with the guide slope portion transitions to a state in which the first lock pin is fitted into the mount lock groove, so that rotation of the mount adapter in the optical-axis rotational direction is regulated.

22. A mount adapter mountable on a mount section of an imaging apparatus,
the imaging apparatus comprising:
a mount section on which a lens device and a mount adapter are mountable;
a contact unit configured to have a camera side contact portion electrically connected to an accessory side contact portion of the lens device; and
a moving mechanical unit configured to support the contact unit movably in the direction of an optical axis of an imaging optical system,
wherein the contact unit includes a second lock pin that is movable in the direction of the optical axis and a biasing unit that biases the lock pin in a second direction that is a direction opposite to the first direction,
wherein the camera side contact portion of the contact unit is movable to a first position that contacts the accessory side contact portion of the lens device to be mounted via a first mount adapter or is movable to a second position that contacts the accessory side contact portion of the lens device to be mounted via a second mount adapter,
wherein the second lock pin is fitted into a mount lock groove formed on a lens device or a mount adapter that is different from the lens device or the mount adapter in which the first lock pin is fitted into the mount lock groove, the mount adapter comprising:

the mount lock groove fitted into the second lock pin, wherein the width of the mount lock groove is equal to the width of the second lock pin in a direction orthogonal to the optical-axis rotational direction or the difference between the width of the mount lock groove and the width of the second lock pin is within a predetermined range.

\* \* \* \* \*